US008624542B2

(12) United States Patent
Gadda

(10) Patent No.: US 8,624,542 B2
(45) Date of Patent: Jan. 7, 2014

(54) METHODS AND SYSTEMS FOR CONTROLLING A MULTIPHASE ELECTROMAGNETIC MACHINE

(71) Applicant: Etagen, Inc., Menlo Park, CA (US)

(72) Inventor: Christopher David Gadda, Palo Alto, CA (US)

(73) Assignee: EtaGen, Inc., Menlo Park, CA (US)

( * ) Notice: Subject to any disclaimer, the term of this patent is extended or adjusted under 35 U.S.C. 154(b) by 0 days.

(21) Appl. No.: 13/691,527

(22) Filed: Nov. 30, 2012

(65) Prior Publication Data
US 2013/0257336 A1 Oct. 3, 2013

Related U.S. Application Data

(63) Continuation of application No. 13/437,659, filed on Apr. 2, 2012, now Pat. No. 8,344,669.

(51) Int. Cl.
H02P 1/24 (2006.01)
(52) U.S. Cl.
USPC .......................... 318/727; 318/805
(58) Field of Classification Search
USPC .......................... 318/727, 798, 805
See application file for complete search history.

(56) References Cited

U.S. PATENT DOCUMENTS

| 4,011,489 | A | | 3/1977 | Franz et al. |
| 4,023,083 | A | | 5/1977 | Plunkett |
| 4,030,017 | A | * | 6/1977 | Brown ............................ 363/45 |
| 4,088,934 | A | | 5/1978 | D'Atre et al. |
| 5,146,145 | A | | 9/1992 | Wood et al. |
| 5,761,375 | A | * | 6/1998 | Naito ............................ 388/806 |
| 5,924,975 | A | | 7/1999 | Goldowsky |
| 6,008,552 | A | | 12/1999 | Yagoto et al. |
| 6,335,606 | B1 | * | 1/2002 | Minagawa et al. ........... 318/801 |
| 6,404,152 | B1 | | 6/2002 | Kobayashi et al. |
| 7,095,141 | B2 | * | 8/2006 | Groening .................. 310/12.18 |
| 7,459,808 | B2 | | 12/2008 | Hol et al. |
| 7,626,478 | B2 | * | 12/2009 | Kawai ............................ 335/299 |

OTHER PUBLICATIONS

Jingwei Zhu, Nesimi Ertugrul, Wen Liang Soong, "Minimum Torque Ripple Current Control Strategy in a Dual Fault Tolerant PM AC Motor Drive," Power Electronics Specialists Conference,IEEE, 2008, pp. 1542-1547.

* cited by examiner

Primary Examiner — Rina Duda
(74) Attorney, Agent, or Firm — Shvarts & Leiz LLP

(57) ABSTRACT

A multiphase electromagnetic machine may be controlled by controlling currents in one or more phases of the multiphase electromagnetic machine. A control system may be used to determine how much current to deliver to, or extract from, each phase. The control system may use an objective function, subject to one or more constraints, to determine the current. The control system may use position information to determine the objective function, constraints, or both.

20 Claims, 10 Drawing Sheets

US 8,624,542 B2

METHODS AND SYSTEMS FOR CONTROLLING A MULTIPHASE ELECTROMAGNETIC MACHINE

This application is a continuation of U.S. patent application Ser. No. 13/437,659, filed Apr. 2, 2012, which is incorporated herein by reference in its entirety.

The present disclosure relates to controlling aspects of a multiphase electromagnetic machine.

BACKGROUND

Electromagnetic machines such as electric motors and generators, for example, may include a stator and a translator configured to move relative to the stator. Electromagnetic machines may include one or more phases, configured to provide a work interaction between the stator and translator. Typical examples include single phase rotary induction motors included in appliances, and three phase synchronous motors used as motor/generator gen-sets.

SUMMARY

A technique for controlling a multiphase electromagnetic machine, which may be implemented by a control system, may include determining a desired electromagnetic force between a translator and a stator of the multiphase electromagnetic machine. The translator may be configured to translate relative to a stator. The stator may include multiple windings forming a plurality of phases. The technique may also include determining a set of current values applied to at least one of the phases based at least in part on the desired electromagnetic force and based at least in part on at least one objective function and at least one constraint.

A technique for controlling a multiphase electromagnetic machine, which may be implemented by a control system, may include determining position information of the translator relative to the stator using a sensor. The technique may include determining a desired electromagnetic force between a translator and a stator of the electromagnetic machine based at least in part on the position information. The technique may include selecting at least one objective function, selecting at least one constraint, and determining a set of current values based at least in part on the at least one objective function and the at least one constraint.

BRIEF DESCRIPTION OF THE FIGURES

The above and other features of the present disclosure, its nature and various advantages will be more apparent upon consideration of the following detailed description, taken in conjunction with the accompanying drawings in which.

DETAILED DESCRIPTION OF THE FIGURES

The present disclosure is directed towards controlling aspects of a multiphase electromagnetic machine. It will be understood that the present disclosure may be applied to any suitable rotary or linear multiphase electromagnetic machine.

[Multiphase Electromagnetic Machines]

Electromagnetic machines may include a stator and a translating unit (e.g., a translator or a rotor), configured to relate their relative movement to electromagnetic activity. The motion of the translating unit relative to the stator may be driven by the electromagnetic activity (e.g., in a motor), or may be used to generate electromagnetic activity (e.g., in a generator). A given electromagnetic machine may be able to operate as a motor, as a generator, or as both, depending upon the circumstances and desired utility.

Figure 1:
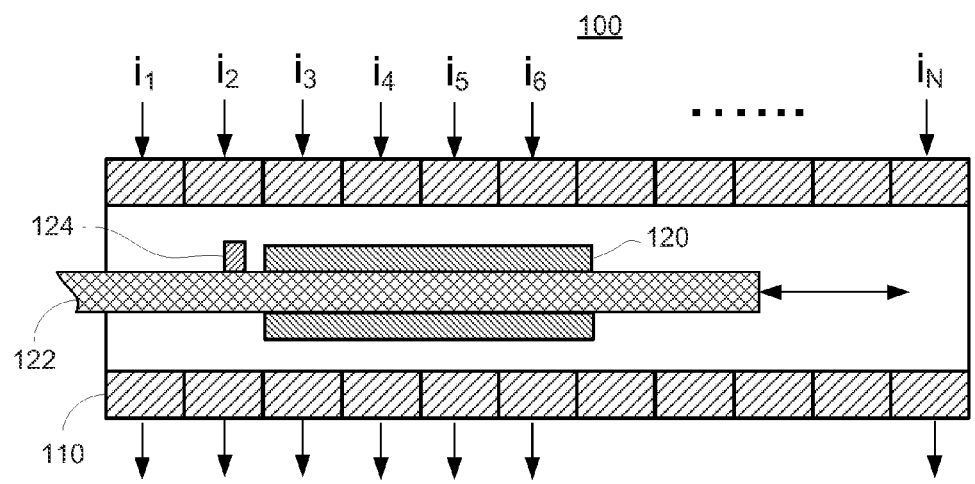
FIG. 1 shows a cross-section view of an illustrative linear electromagnetic machine (LEM), in accordance with some embodiments of the present disclosure.

FIG. 1 shows a cross-section view of an illustrative linear electromagnetic machine (LEM) 100, in accordance with some embodiments of the present disclosure. LEM 100 includes stator 110 and translator 120 configured to move (i.e., translate) relative to stator 110, as shown by the double-tipped motion arrow in FIG. 1. LEM 100 may include an inductive LEM, a permanent magnet LEM (e.g., a synchronous LEM), a switched reluctance LEM, any other suitable type of LEM, or any combination thereof. Stator 110 includes N phases, which each may include conductive windings for generating a magnetic field. In some embodiments, a control system (not shown in FIG. 1) may be used to supply currents $i_1$-$i_N$ to windings of each phase (e.g., using a suitable power subsystem), as shown in FIG. 1, to generate controllable magnetic fields which may interact with translator 120 (e.g., translate translator 120 relative to stator 110). In some embodiments, a control system may be used to extract currents $i_1$-$i_N$ (i.e., as electric work) from windings of each phase, as shown in FIG. 1, as translator 120 is translated relative to stator 110 to generate an electromotive force (emf) in one more phases of stator 110. Translator 120 may include one or more permanent magnets (e.g., used for a permanent magnet LEM), one or more conductive structures (e.g., used for an inductive LEM), windings, any other suitable components, or any combination thereof. Translator 120 may be coupled to a linkage, such as linkage 122, to transfer work to another component (not shown). For example, linkage 122 may include a piston rod or other linkage to provide mechanical work (e.g., for a compressor, a fan, an engine, or any other suitable machine). Although the stator is described in the context of FIG. 1 as including windings, in some embodiments, the stator may include permanent magnets or other components (e.g., a conductive assembly for use with an inductive machine), and the translator may include multiple windings corresponding to the multiple phases. The present disclosure may be implemented for any suitable arrangement of a stator and translator, having four or more phases. In some embodiments, the four or more phases may include four phases capable of generating an electromotive force between the stator and translator. In some embodiments, the four or more phases may include three phases capable of generating an electromotive force between the stator and translator, and one or more virtual phases that may carry current but are not configured to generate any substantial electromotive force between the stator and the translator, at any relative position.

In some embodiments, sensor 124 may be coupled to LEM 100, integrated as part of LEM 100, or otherwise communicate with LEM 100. Sensor 124 may be configured to sense position information of translator 120 relative to stator 110 or a fixed reference frame. For example, sensor 124 may include a linear encoder such as, an optical encoder, a magnetic encoder, an inductive encoder, a capacitive encoder, an image-based encoder, any other suitable encoder, or any combination thereof. In a further example, sensor 124 may include an accelerometer affixed to translator 120, linkage 122, or both. Position information may include, for example, an absolute or relative position, linear velocity, linear acceleration, angle, angular velocity, angular acceleration, any other suitable absolute or relative position information, or any combination thereof. In some embodiments, depending upon position information of translator 120, one or more phases of the N phases of LEM 100 may not necessarily exhibit a substantial electromagnetic interaction with translator 120. Accordingly, a control system may control the current, which may be positive or negative (i.e., may flow in either direction), in one or more phases of the N phases of LEM 100 based on position information. It will be understood that although a stator will be discussed herein as being stationary, a stator may move relative to a fixed inertial reference frame, and that it is the relative motion between the stator and a corresponding translator that is of primary interest.

Figure 2:
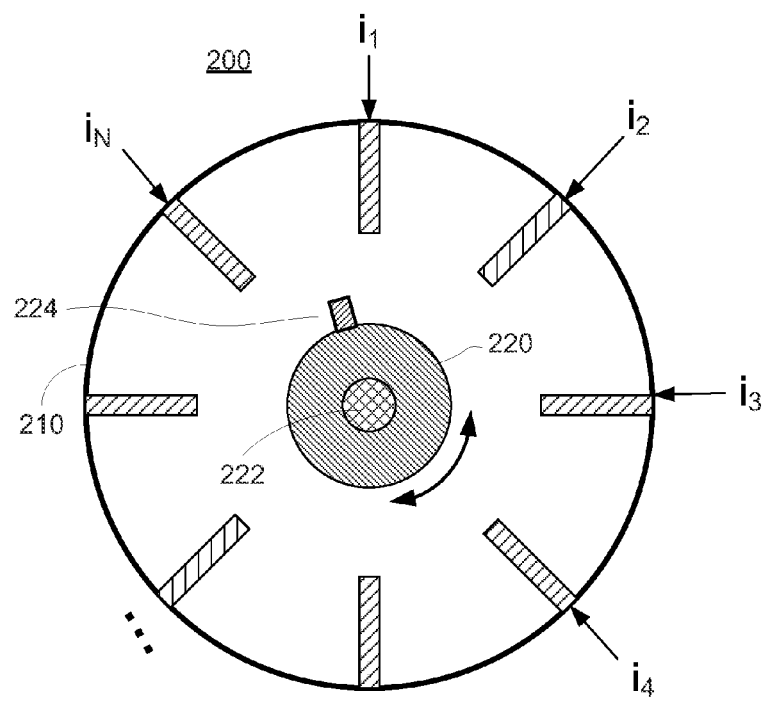
FIG. 2 shows a cross-section view of an illustrative rotary electromagnetic machine, in accordance with some embodiments of the present disclosure.

FIG. 2 shows a cross-section view of an illustrative rotary electromagnetic machine (REM) 200, in accordance with some embodiments of the present disclosure. REM 200 includes stator 210 and rotor 220 configured to move (i.e., rotate) relative to stator 210, as shown by the double-tipped motion arrow in FIG. 1. REM 200 may include an inductive REM, a permanent magnet REM (e.g., a synchronous REM), a switched reluctance REM, any other suitable type of REM, or any combination thereof. Stator 210 includes N phases, which each may include conductive windings for generating a magnetic field. In some embodiments, a control system (not shown in FIG. 2) may be used to supply currents $i_1$-$i_N$ to windings of each phase (e.g., using a suitable power subsystem), as shown in FIG. 2, to generate controllable magnetic fields which may interact with translator 220 (e.g., rotate rotor 220 relative to stator 210). In some embodiments, a control system may be used to extract currents $i_1$-$i_N$ (i.e., as electric work) from windings of each phase, as shown in FIG. 2, as rotor 220 is translated relative to stator 210 to generate an electromotive force (emf) in one or more phases of stator 210. Rotor 220 may include one or more permanent magnets (e.g., used for a permanent magnet LEM), one or more conductive structures (e.g., used for an inductive LEM), windings, any other suitable components, or any combination thereof. Rotor 220 may be coupled to a linkage, such as linkage 222, to transfer work to another component (not shown). For example, linkage 222 may include a rotatable shaft or other linkage to provide mechanical work (e.g., for a compressor, a fan, an engine, or any other suitable machine).

In some embodiments, sensor 124 may be coupled to REM 200, integrated as part of REM 200, or otherwise communicate with REM 200. Sensor 224 may be configured to sense position information of rotor 220 relative to stator 210 or a fixed reference frame. For example, sensor 224 may include a rotary encoder such as, an optical encoder, a magnetic encoder, an inductive encoder, a capacitive encoder, an image-based encoder, any other suitable encoder, or any combination thereof. In a further example, sensor 224 may include an accelerometer affixed to rotor 220, linkage 222, or both. Position information may include, for example, an absolute or relative position, linear velocity, linear acceleration, angle, angular velocity (e.g., or an angular frequency such as rpm), angular acceleration, any other suitable absolute or relative position information, or any combination thereof. A control system may control the current, which may be positive or negative (i.e., may flow in either direction), in one or more phases of the N phases of REM 200 based on position information.

Figure 3:
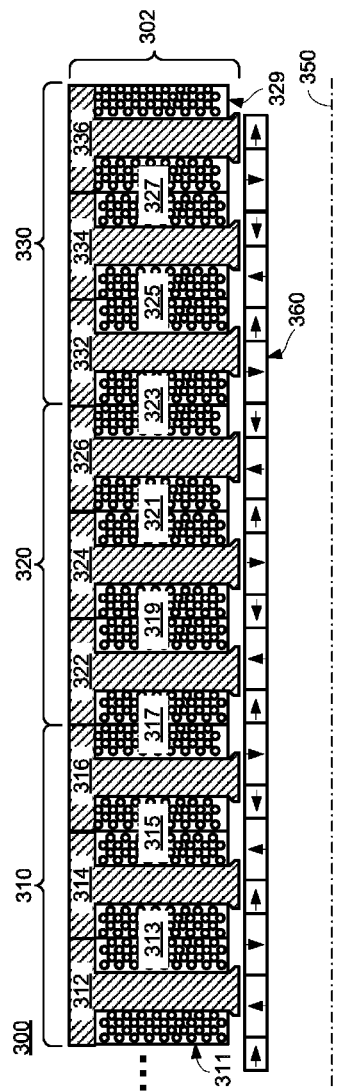
FIG. 3 shows a partial cross-section view of an illustrative LEM, having iron cores, windings, and permanent magnets, in accordance with some embodiments of the present disclosure.

FIG. 3 shows a partial cross-section view of an illustrative LEM 300, having iron cores, windings, and permanent magnets, at a first position, in accordance with some embodiments of the present disclosure. LEM 300 has center axis 350, along which translator 360 may be configured to move. Although shown as being substantially cylindrical, a LEM may be flat (i.e., layered in parallel planes), have any other two dimensional or three dimensional arrangement, or any combination thereof. LEM 300 may include stator 302, having at least phases 310, 320, and 330. Phase 310 may include iron cores 312, 314, and 316 that are centered about axis 350, and extend circumferentially around axis 350. Phase 320 may include iron cores 322, 324, and 326 that are centered about axis 350, and extend circumferentially around axis 350. Phase 330 may include iron cores 332, 334, and 336 that are centered about axis 350, and extend circumferentially around axis 350. Iron core 312 is positioned axially between windings 311 and 313.

Iron core 314 is positioned axially between windings 313 and 315. Iron core 316 is positioned axially between windings 315 and 317. Iron core 322 is positioned axially between windings 317 and 319. Iron core 324 is positioned axially between windings 319 and 321. Iron core 326 is positioned axially between windings 321 and 323. Iron core 332 is positioned axially between windings 323 and 325. Iron core 334 is positioned axially between windings 325 and 327. Iron core 336 is positioned axially between windings 27 and 329. Each of windings 311, 313, 315, 317, 319, 321, 323, 325, 327, and 329 (i.e., along with any other suitable windings of stator 302 will be referred to as "the windings of stator 302") may include one or more sets of windings of a conductive material (e.g., insulated metal wire) which may be wired in series, parallel, or wired independently, in any suitable orientation about axis 350 (e.g., clockwise or counter-clockwise about axis 350). The iron cores and windings of stator 302 may be used to generate a magnetic field causing a net electromagnetic force on translator 360. The net electromagnetic force may be oriented in a direction substantially parallel to axis 350. Accordingly, referencing an REM (not shown in FIG. 3), iron cores and windings of a stator may be used to generate a magnetic field causing a net torque on a translator about a center axis. Although not shown in FIG. 3, it will be understood that a stator need not include windings, in accordance with the present disclosure. For example, in some embodiments, a stator may include multiple permanent magnets, and a corresponding translator may include windings corresponding to four or more phases. In a further example, in some embodiments, a stator may include multiple permanent magnets, and a corresponding translator may include windings corresponding to three or more phases, and a corresponding control system may implement one or more virtual phases.

Figure 4:
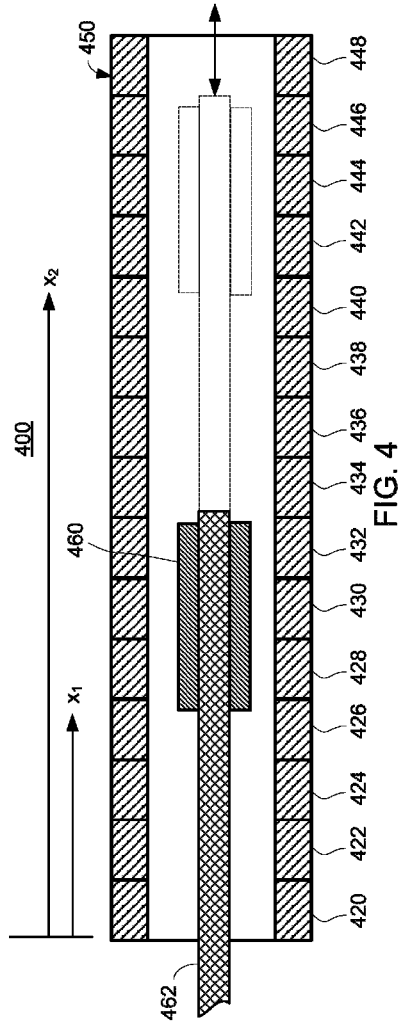
FIG. 4 shows a cross-section view of an illustrative LEM, in accordance with some embodiments of the present disclosure.

Translator 360, as shown in FIG. 3, includes a Hallbach array of multiple permanent magnets arranged axially (relative to axis 350), with the arrows within translator 360 illustratively indicating the polarity of the magnets (e.g., the tail of each arrow corresponds to a south pole, and the point of each arrow corresponds to a north pole). It will be understood that the Hallbach array of FIG. 3 is an illustrative example, and that a translator or rotor may include any suitable arrangement of permanent magnets, or may include no permanent magnets (e.g., an induction electromagnetic machine). As translator 360 moves along axis 350 relative to stator 302, current may be provided to or extracted from windings of one or more of phases 310, 320, and 330. FIG. 4 shows a cross-section view of illustrative LEM 300 shown in FIG. 3, with translator 360 at a second position relative to stator 302, in accordance with some embodiments of the present disclosure. In some embodiments, depending position information of translator 360 relative to stator 302, only some of the phases of stator 302 need have substantially non-zero current flows. In some embodiments, depending on the position information of translator 360 relative to stator 302, one or more of the phases of stator 302 may have relatively smaller current flows.

FIG. 4 shows a cross-section view of an illustrative LEM 400, in accordance with some embodiments of the present disclosure. As illustrated in FIG. 4, LEM 400 includes stator 450 having phases 420, 422, 424, 426, 428, 430, 432, 434, 436, 438, 440, 442, 444, 446, and 448 (i.e., illustrative LEM 400 is a 15-phase electromagnetic machine). Translator 460, rigidly coupled to rod 462 as illustrated in FIG. 4, is capable of moving substantially in the direction of the double tipped arrow shown in FIG. 4. For example, translator 460 is located at position $x_1$, and move to position $x_2$, as shown by the dotted line. At position $x_1$, translator 460 may be expected to have a substantial electromagnetic interaction with phases 428, 430, and 432, a relatively weaker electromagnetic interaction with phase 426, and relatively an even weaker electromagnetic interaction with the other phases. As translator 460 moves relative to stator 450, the expected electromagnetic interaction between translator 460 and each phase may change. In some embodiments, the currents carried by each phase may be restricted to sum to zero. In some such embodiments, any non-zero current sum from phases having the strongest electromagnetic interaction with translator 460 may be distributed to phases not having a substantial electromagnetic interaction with translator 460.

[Control System]

A control system may be used to control motion, force, work, any other aspects of an electromagnetic machine, or any combination thereof based on a desired performance. As the number of phases of the electromagnetic machine increases, to more than three phases, for example, coordination of the currents in each of the phases may become challenging. Accordingly, techniques for controlling multiphase electromagnetic machines may be desired to reduce system losses, increase system efficiency, and mitigate system failure.

In some embodiments, a control system may receive information from one or more sensors, user inputs, reference databases, any other sources, or any combination thereof, and determine corresponding control responses. For example, a control system may receive position information relating to a translator and stator of an electromagnetic machine, along with desired force information from a database, and determine current values for one or more winding phases of the electromagnetic machine. In some embodiments, a control system may control the current in each phase of a multiphase electromagnetic machine. In some embodiments, the control system may control the current in each phase based on position information, flux information, any other suitable information, or any combination thereof. The control system may control the magnitude of current in each phase, direction of current flow in each phase, or both.

Figure 5:
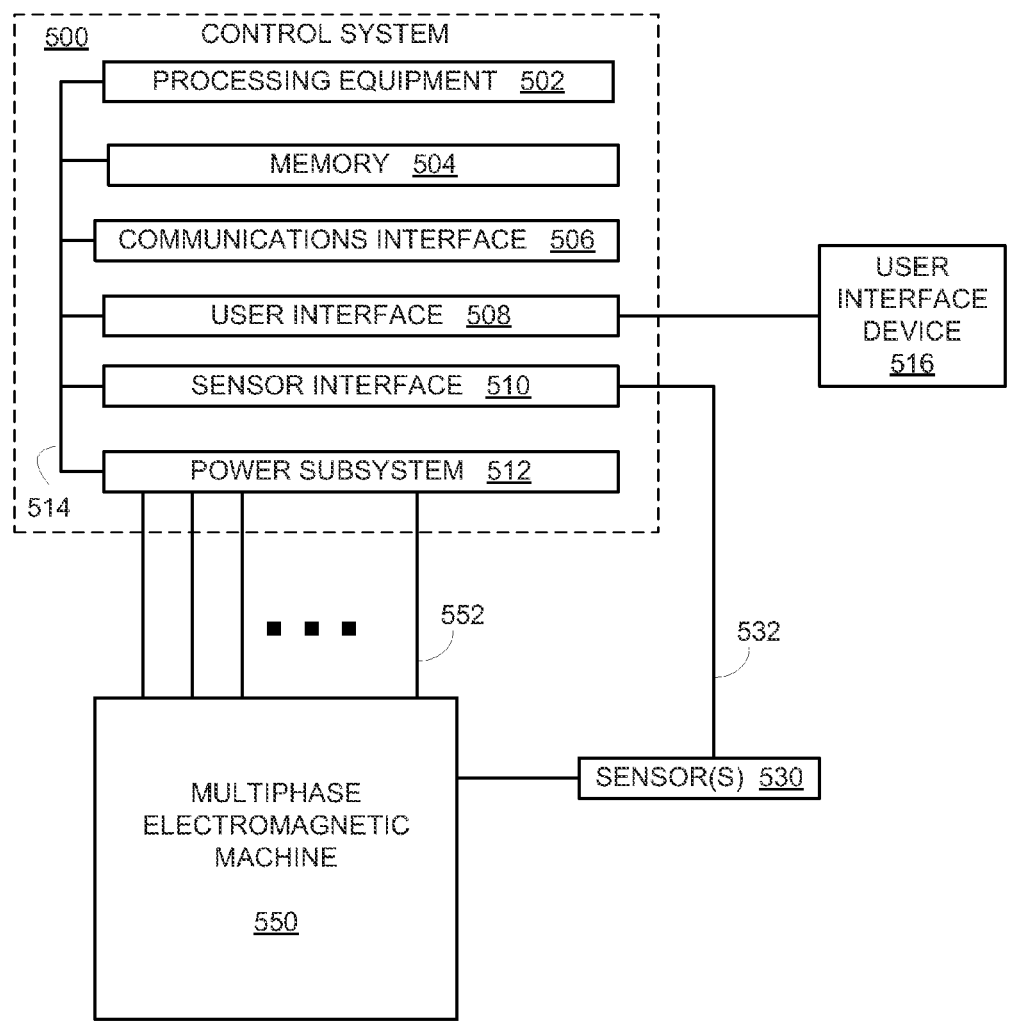
FIG. 5 is a block diagram of an illustrative control system for controlling an electromagnetic machine, in accordance with some embodiments of the present disclosure.

FIG. 5 is a block diagram of an illustrative control system 500 for controlling a multiphase electromagnetic machine 550, in accordance with some embodiments of the present disclosure. Multiphase electromagnetic machine 550 may include multiple windings corresponding to multiple phases. For example, multiphase electromagnetic machine may include a stator having ten phases, which may electromagnetically interact with a translator (e.g., to apply force to the translator, generate current from relative motion of the translator, or both). The current flow in each winding may be controlled by control system 500 and supplied/received using power subsystem 512.

Control system 500 may include processing equipment 502, memory 504, one or more communications interfaces 506, one or more user interfaces 508, sensor interface 510, power subsystem 512, any other suitable components or modules that are not shown, or any combination thereof. Control system 500 may be implemented at least partially in one or more computers, terminals, control stations, handheld devices, modules, any other suitable interface devices, or any combination thereof. In some embodiments, the components of control system 500 may be communicatively coupled via a communications bus 514, as shown in FIG. 5.

Processing equipment 502 may include a processor (e.g., a central processing unit), cache, random access memory (RAM), read only memory (ROM), any other suitable components, or any combination thereof that may process information regarding multiphase electromagnetic machine 550.

Memory 504 may include any suitable volatile or non-volatile memory that may include, for example, random access memory (RAM), read only memory (ROM), flash memory, a hard disk, any other suitable memory, or any combination thereof. Information stored in memory 504 may be accessible by processing equipment 502 via communications bus 514. For example, computer readable program instructions (e.g., for implementing the techniques disclosed herein) stored in memory 504 may be accessed and executed by processing equipment 502. In some embodiments, memory 504 may include a non-transitory computer readable medium for storing computer executable instructions that cause processing equipment 502 (e.g., processing equipment of a suitable computing system), to carry out a method for controlling a multiphase electromagnetic machine. For example, memory 504 may include computer executable instructions for implementing any of the control techniques described herein.

Communications interface 506 may include a wired connection (e.g., using IEEE 802.3 ethernet, or universal serial bus interface protocols), wireless coupling (e.g., using IEEE 802.11 "Wi-Fi", or Bluetooth protocols), optical coupling, inductive coupling, any other suitable coupling, or any combination thereof, for communicating with one or more systems external to control system 500. For example, communications interface 506 may include a USB port configured to accept a flash memory drive. In a further example, communications interface 506 may include an Ethernet port configured to allow communication with one or more devices, networks, or both.

User interface 508 may include a wired connection (e.g., using IEEE 802.3 ethernet, or universal serial bus interface, tip-ring-seal RCA type connection), wireless coupling (e.g., using IEEE 802.11 "Wi-Fi", Infrared, or Bluetooth), optical coupling, inductive coupling, any other suitable coupling, or any combination thereof, for communicating with one or more of user interface devices 516. User interface devices 516 may include a display, keyboard, mouse, audio device, any other suitable user interface devices, or any combination thereof. For example, a display may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. Further, a display may include a touchscreen, which may provide tactile interaction with a user by, for example, offering one or more soft commands on a display screen. In a further example, user interface devices 516 may include a keyboard such as a QWERTY keyboard, a numeric keypad, any other suitable collection of hard command buttons, or any combination thereof. In a further example, user interface devices 516 may include a mouse or any other suitable pointing device that may control a cursor or icon on a graphical user interface displayed on a display screen. In a further example, user interface devices 516 may include an audio device such as a microphone, a speaker, headphones, any other suitable device for providing and/or receiving audio signals, or any combination thereof.

Sensor interface 510 may include a power supply for supplying power to sensor(s) 530, a signal conditioner, a signal pre-processor, any other suitable components, or any combination thereof. For example, sensor interface 510 may include one or more filters (e.g., analog and/or digital), an amplifier, a sampler, and an analog to digital converter for conditioning and pre-processing signals from sensor(s) 530. Sensor interface 510 may communicate with sensor(s) 530 via communicative coupling 532, which may be a wired connection (e.g., using IEEE 802.3 ethernet, or universal serial bus interface), wireless coupling (e.g., using IEEE 802.11 "Wi-Fi", or Bluetooth), optical coupling, inductive coupling, any other suitable coupling, or any combination thereof.

Sensor(s) 530 may include any suitable type of sensor, which may be configured to sense any suitable property or aspect of multiphase electromagnetic machine 550. In some embodiments, sensor(s) 530 may include a linear encoder, rotary encoder, or both, configured to sense a relative position between a translator and stator of multiphase electromagnetic machine 550. In some embodiments, sensor(s) 530 may include an accelerometer configured to sense am acceleration of a translator relative to a fixed stator of multiphase electromagnetic machine 550. In some embodiments, sensor(s) 530 may include a camera configured to capture images (e.g., time-lapse imaging) of a translator relative to a stator of multiphase electromagnetic machine 550. In some embodiments, sensor(s) 530 may include one or more current and/or voltage sensors (e.g., an ammeter and/or voltmeter coupled to a phase multiphase electromagnetic machine 550) configured to sense a voltage, current, work output and/or input (e.g., current multiplied by voltage), any other suitable electrical property of multiphase electromagnetic machine 550, or any combination thereof. In some embodiments, sensor(s) 530 may include one or more temperature sensors such as, for example, a thermocouple, a thermistor, a resistance temperature detector (RTD), any other suitable sensor for detecting temperature, or any combination thereof. For example, sensor(s) 530 may include a thermocouple arranged to measure a temperature of a permanent magnet, a winding, a power subsystem component such as a transistor, or any other component of a multiphase electromagnetic machine for which temperature information may be measured.

Power subsystem 512 may include control circuitry, power electronics, electric loads (e.g., for dissipation), grounds, terminal strips, electric bus lines for providing power, insulated gate bipolar transistors (IGBTs), mechanical relays, power diodes, thyristors, metal oxide semiconductor field-effect transistors (MOSFETs), any other suitable transistors, switches, pulse width modulation controllers, digital to analog controllers, any other suitable electronic components, any other suitable controllers, or any combination thereof. Power subsystem 512 may receive control signals via communications bus 514 from processing equipment 502 regarding multiphase electromagnetic machine 550. For example, power subsystem 512 may include multiple IGBTs coupled via power coupling 552 to corresponding phases of the multiple phases of multiphase electromagnetic machine 550. The IGBTs may be coupled to a high and low bus voltage lines, and the windings of the phases, which may be coupled to a neutral line. In some embodiments, power coupling 552 may include one or more cables. For example, each phase of multiphase electromagnetic machine 550 may be coupled via two-conductor cable to corresponding terminals of power subsystem 512. In some embodiments, power subsystem may include a virtual phase, which may accommodate current flow, but does not correspond to any phase of multiphase electromagnetic machine 550.

Figure 6:
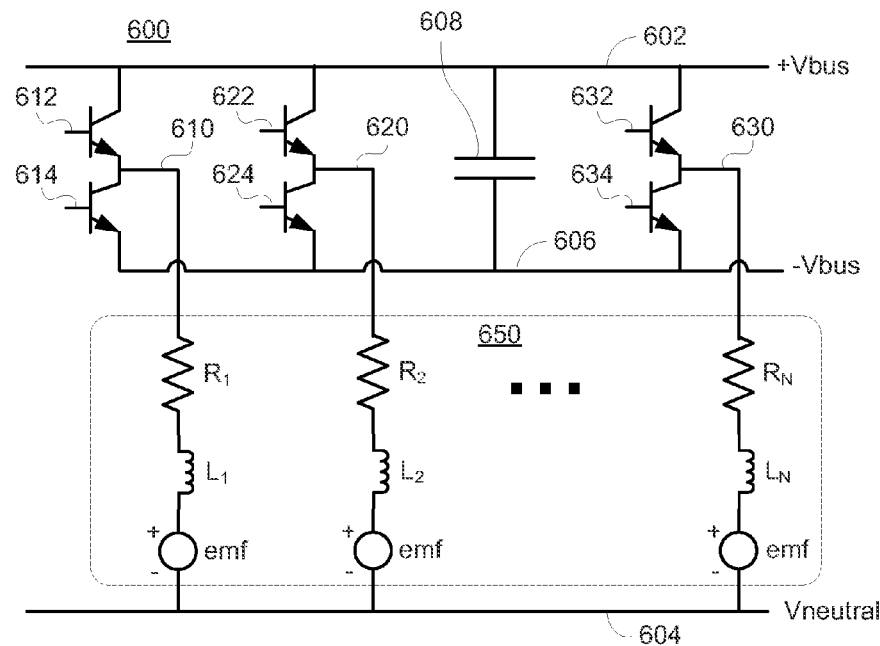
FIG. 6 is a schematic diagram of an illustrative equivalent circuit corresponding to an electromagnetic machine and power subsystem, in accordance with some embodiments of the present disclosure.

FIG. 6 is a schematic diagram of an illustrative equivalent circuit 600 corresponding to a multiphase electromagnetic machine and power subsystem, in accordance with some embodiments of the present disclosure. As illustrated in FIG. 6, each phase of the multiphase electromagnetic machine and control system are coupled via two conductors (e.g., one coupled to low voltage bus line 604 and one coupled to corresponding IGBTs). FIG. 6 shows multiple phases (i.e., N phases) 610, 620, and 630, which may each be controlled separately by a suitable control system (e.g., control system 500 of FIG. 5). Phases 610, 620, and 630 may be controlled using IGBTs 612 and 614, IGBTs 622 and 624, and IGBTs 632 and 634, respectively. In some embodiments, IGBTs 612 and 614, IGBTs 622 and 624, and IGTBs 632 and 634 may be coupled to control circuitry of power subsystem 512, circuitry of processing equipment 502, or both, which may provide signals to the IGBTs. System 650 includes a multiphase electromagnetic machine and corresponding couplings to the control system. Each phase may include an emf, generated by the stator and translator. Each phase may also include resistive loads (e.g., wire and connector resistances), inductive loads (e.g., from current flow in windings of each phase), or both as shown in FIG. 6. In some embodiments, the control system may also include resistive load, inductive load, or both, which may act in concert with the loads of the electromagnetic machine and couplings.

Each phase, as shown in FIG. 6, may operate between voltage bus lines (e.g., high voltage bus line 602 and low voltage bus line 606), neutral (e.g., neutral 604), or both. In some embodiments, high voltage bus line 602 may operate at relatively higher voltage than low voltage bus line 606. For example, high voltage bus line 602 may operate at about 720 VDC, and low voltage bus line 606 may operate at about 0 VDC. In a further example, high voltage bus line 602 and low voltage bus line 606 may be symmetric about 0 VDC (e.g., 360 VDC and −360 VDC, respectively). Voltage bus lines may have any suitable relative voltage difference, and may be defined relative to any suitable reference potential. In an illustrative example, the control system may provide a signal to IGBT 612, allowing current flow from high voltage bus line 602 to neutral 604. In a further illustrative example, the control system may provide a signal to IGBT 614, allowing current flow from neutral 604 to low voltage bus line 606. In some embodiments, the control system may provide a pulsewidth modulated signal to IGBTs 612, 614, 622, 624, 632, and 634 to control the effective voltage differential and resulting current flow in each respective phase. It will be understood that a power subsystem of a control system may include one or more IGBTs, as shown in FIG. 6, one or more mechanical relays, one or more power diodes, one or more thyristors, one or more metal oxide semiconductor field-effect transistors (MOSFETs), any other suitable transistors, any other suitable components for switching electric power, or any combination thereof. As referred to herein, current flow from high voltage bus line 602 to low voltage bus line 606 will be positive, and current flow from low voltage bus line 606 to neutral 604 will be negative. Depending on the relative position of the translator and stator of the multiphase electromagnetic machine, current may be allowed to flow in one or more phases. In some embodiments, neutral 606 may be grounded. In some embodiments, the neutral points may be connected in a wye configuration. Any suitable electrical arrangement which allows independent current control through each phase of a multiphase electromagnetic machine may be used, in accordance with the present disclosure. In some embodiments, an effective capacitance may be included between high and low voltage bus lines 602 and 606, as shown illustratively by capacitor 608.

Figure 7:
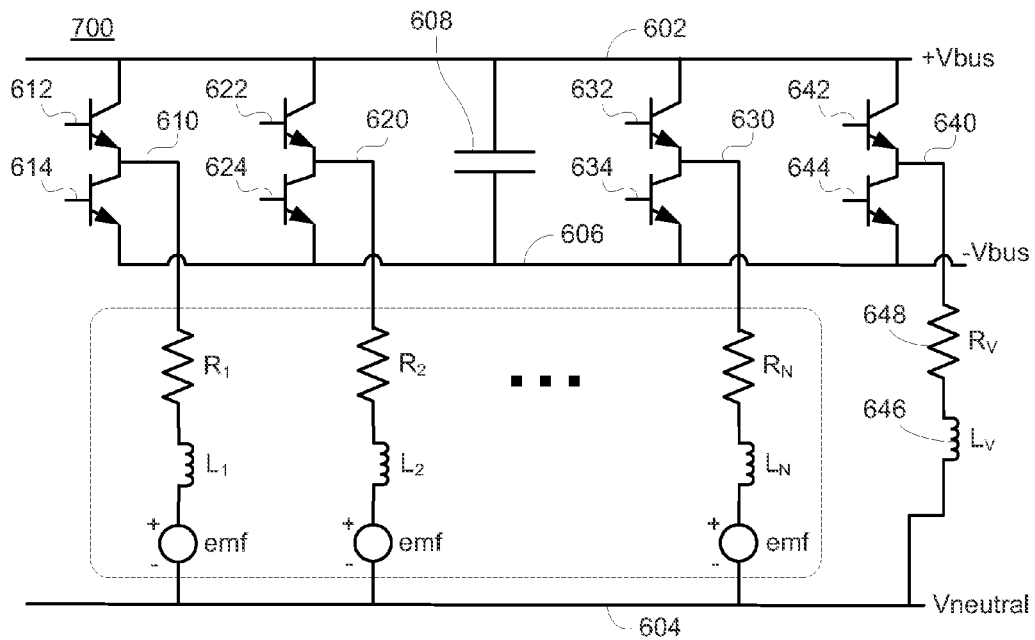
FIG. 7 is a schematic diagram of an illustrative equivalent circuit corresponding to an electromagnetic machine, having a virtual phase, and power subsystem, in accordance with some embodiments of the present disclosure.

FIG. 7 is a schematic diagram of an illustrative equivalent circuit 700 corresponding to a multiphase electromagnetic machine, having a virtual phase, and power subsystem, in accordance with some embodiments of the present disclosure. Equivalent circuit 700 includes the elements of equivalent circuit 600, with the addition of virtual phase 640, which does not correspond to a phase of the multiphase electromagnetic machine. The virtual phase is electrically coupled to neutral 604, but does not have electromagnetic interaction with the multiphase electromagnetic machine (e.g., the force constant of the virtual phase is substantially zero). In some embodiments, the sum of the currents in the N phases of the electromagnetic machine may sum to zero. In some embodiments, the sum of the currents in the N phases of the electromagnetic machine need not sum to zero. In some such embodiments, the use of a virtual phase such as virtual phase 640 may provide a path for the nonzero current provided to or generated by the multiphase electromagnetic machine. The control system may include IGBTs 642 and 644, which may be used to control current flow through virtual phase 640. Virtual phase 640 may include inductor 646, effective resistance shown by resistor 648, any other suitable impedance, any other suitable electronic components, or any combination thereof. It is advantageous for the effective resistance of virtual phase 640 to be relatively small compared to the other phases, and typically should be as small as possible. The inductance of inductor 646 should be selected to allow controllable operation of the current in virtual phase 640, and preferably inductor 646 should have low resistance. Virtual phase 640 may be used to provide an efficient current path, which allows the sum of the currents in the other "real" phases (i.e., motor/generator phases) to not necessarily be restricted to zero. This arrangement may allow for improved control flexibility, with relatively low losses in the virtual phase. For example, if a particular phase has been disabled or compromised, virtual phase 640 may carry significant currents and allow for flexible operation of the multiphase electromagnetic machine. Virtual phase 640 may be especially useful in arrangements having relatively smaller phase counts, for which distributing current among phases not having substantial electromagnetic interaction is relatively less effective. For example, if a multiphase electromagnetic machine has a high phase count, current may distributed among many phases distal to the translator with relatively low impact to system efficiency (e.g., due to the $i^2R$ ohmic losses).

In some embodiments, a virtual phase may be directly controlled by a control system. Direct control of the virtual phase may be implemented by a control system having control components included as part of a virtual phase (e.g., as shown in FIG. 7). For example, a control system may directly control the current in a virtual phase by applying a PWM signal to one or more IGBTs, as shown in FIG. 7. In some embodiments, a virtual phase may be indirectly controlled. Indirect control of the virtual phase may be implemented by connecting a neutral point to a substantially fixed potential. For example, multiple phases capable of generating an electromotive force (i.e., motor/generator phases) may be connected in a wye arrangement having a neutral point, and the neutral point may be grounded. In a further example, multiple phases capable of generating an electromotive force (i.e., motor/generator phases) may be connected in a wye arrangement having a neutral point, and the neutral point may be connected to a substantially fixed potential equal to the average of the bus line voltages. The current in the virtual phase may then be determined based on the sum of the controlled currents carried by the motor/generator phases. In some embodiments, the fixed potential may be an average potential of the high voltage bus line and the low voltage bus line (e.g., when using an isolated DC bus). In some embodiments, the fixed potential may be a biased potential, relatively nearer in value to either the high voltage bus line or the low voltage bus line. In some embodiments, a control system may achieve substantially zero torque/force ripple by including a directly or indirectly controlled virtual phase. For example, if a motor/generator phase is damaged or otherwise disabled, the control system may achieve substantially zero torque/force ripple by implementing a virtual phase. Accordingly, an electromagnetic machine having three or more motor/generator phases may be controlled to operate with substantially zero torque/force ripple even with a disabled phase by using a virtual phase.

[Control Techniques]

In some embodiments, the currents in each phase of an electromagnetic machine may be set to predefined values, limited, or otherwise controlled to provide a desired force, a desired position, or both. In some embodiments, a relative position and motion of a translator and corresponding stator may be controlled. In some embodiments, a force generated by a translator and corresponding stator may be controlled. In some embodiments, a current in one or more winding phases may be controlled. For example, an electromagnetic machine may be integrated into a piston engine, and work interactions (e.g., electric work output) may be controlled based on desired performance. Depending on the desired performance, one or more control strategies may be applied by the control system such as, for example, constraining current values using particular current constraints.

Figure 8:
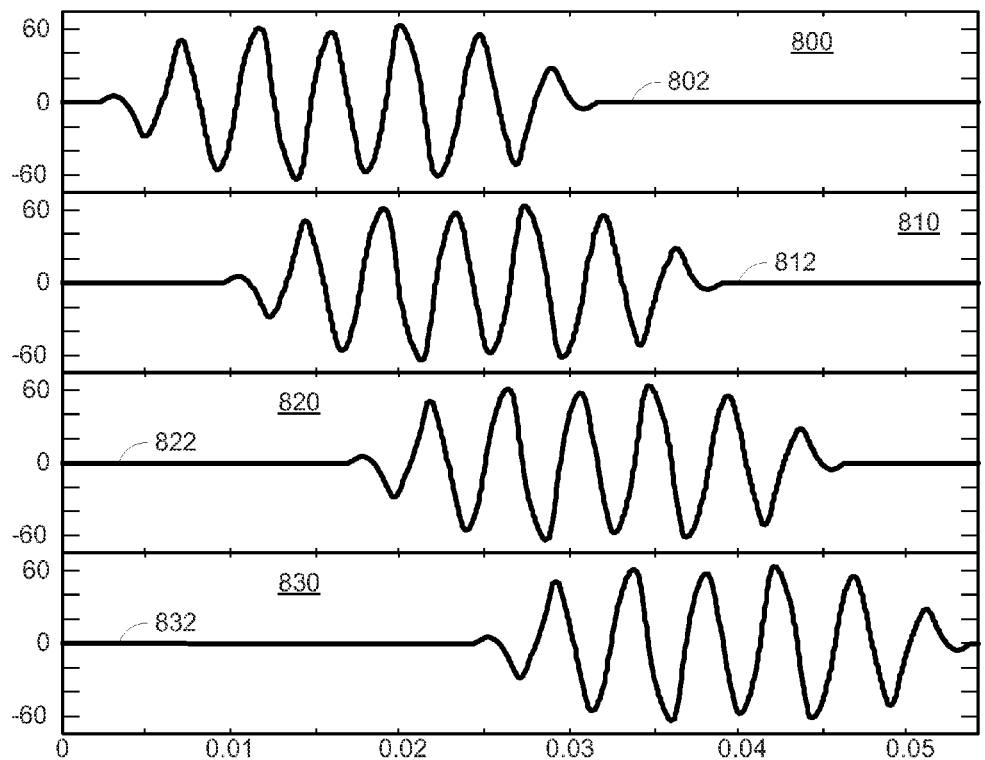
FIG. 8 shows an illustrative current schedule for a linear electromagnetic machine, in accordance with some embodiments of the present disclosure.

FIG. 8 shows an illustrative current schedule for a LEM, in accordance with some embodiments of the present disclosure. The abscissa of plots 800, 810, 820 and 830 is shown in arbitrary units of translational position. The ordinate of plots 800, 810, 820, and 830 is shown in arbitrary units of current. Plots 800, 810, and 820 shows corresponding current schedules 802, 812, and 822 corresponding to a first, second and third phase, respectively, of a multiphase electromagnetic machine. As illustrates, the current schedules in FIG. 8 may correspond to the translator moving from left to right relative to the stator. It will be understood that the current schedules shown in FIG. 8 may be implemented with multiphase electromagnetic machines having a translator shorter in axial length than the stator, and that other current schedules may be used for other arrangements. Plot 800 shows current schedule 802 corresponding to a first phase. Following the left-to-right direction in plot 800, current schedule 802 starts at zero, exhibits several periods of oscillatory behavior and then flat-lines to zero. The first zero portion is indicative of the translator having a relative position to the left of the first phase, in which case the electromagnetic interaction between the translator and the first phase may be minimal. As the translator moves to the right, electromagnetic interaction between the translator and the first phase increases. The oscillatory character of current schedule 802 may be due to alternating north and south poles of the translator. The rightmost flat-line portion of current schedule 802 may be due to the translator having a relative position to the right of the first phase, in which case the electromagnetic interaction between the translator and the first phase may be insignificant. Plot 810 shows current schedule 812 corresponding to a second phase, to the right of the first phase. Accordingly, current schedule 812 resembles current schedule 802, although shifted to the right to correspond to the position of the second phase relative to the first. Plot 820 shows current schedule 822 corresponding to a third phase, to the right of the second phase. Accordingly, current schedule 822 resembles current schedules 802 and 812, although shifted to the right to correspond to the position of the third phase relative to the second. Plot 830 shows current schedule 832 corresponding to a fourth phase, to the right of the third phase. Accordingly, current schedule 832 resembles current schedules 802, 812, and 822 although shifted to the right to correspond to the position of the fourth phase relative to the third. As shown in FIG. 8, each phase may only be utilized (e.g., allowed a non-zero current flow) when the translator is positioned near the phase (i.e., electromagnetically interacts with the phase). Also shown in FIG. 8, the amplitude of the current in each phase may be ramped up and down as the translator approaches and leaves the vicinity of the phase. For comparison, sinusoidal current schedules may be used with a typical three-phase rotary electromagnetic machine, rather than the ramped and flat-lined current schedules shown in FIG. 8. It will be understood that the terms "left" and "right", as used herein are merely for exemplary reference, and are not meant to imply a desired orientation of a control system, electromagnetic machine, or system.

It will be understood that the current schedule shown in FIG. 8 may correspond to a permanent magnet type multiphase electromagnetic machine, having a relatively longer stator than translator. Current schedules may exhibit any suitable profile, similar or different from those shown in FIG. 8, whether for induction electromagnetic machines, permanent magnet electromagnetic machines, switched reluctance electromagnetic machines, any other suitable electromagnetic machine having four or more phases (one of which may be a virtual phase), or any combination thereof. For example, referencing an inductive electromagnetic machine, some current in a particular phase may be allocated to maintaining translator (or rotor) flux, and some current in the phase may be allocated to apply the desired electromagnetic force. Accordingly, the current schedules for the inductive machine may depend on position, desired flux, and/or actual (e.g., estimated or measured) flux, which may in turn be dependent upon the history of current values. It will also be understood that some electromagnetic machines may include a translator relatively longer than the corresponding stator. Accordingly, the current schedule for the longer translator case may exhibit a substantially different from that shown in FIG. 8 (e.g., without flat-lined portions, or with reduced flat-lined portions).

Figure 9:
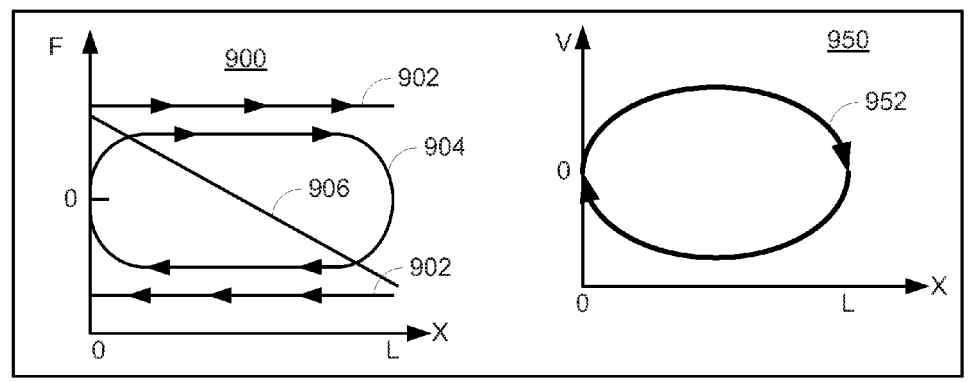
FIG. 9 shows three illustrative desired force profiles and a velocity profile, in accordance with some embodiments of the present disclosure.

FIG. 9 shows illustrative desired force profiles 902, 904, and 906 in plot 900, and illustrative velocity profile 952 in plot 950, in accordance with some embodiments of the present disclosure. The force profiles shown in plot 900 correspond to motor action of the electromagnetic machine, where the arrows in the figure represent relative translator motion along the x axis. Generator action may be achieved by reversal of the arrows in plot. Force profiles 902, 904, and 906 represent relatively simple force profile examples which may be implemented in accordance with the present disclosure. It will be understood that any suitable desired force profile may be used, of any suitable complexity, which may be symmetric or asymmetric with regards to the direction of motion of the translator. Illustrative desired force profile 902 includes two portions, one corresponding to motion of the translator in a first direction, and the other corresponding to motion of the translator in the opposite direction. Desired force profile 902 may be implemented, for example, as a two-value quantity in the control techniques described herein. For example, depending on the direction of motion of the translator relative to the stator, the control system may use either of the two desired force values of desired force profile 902 (e.g., the force acting in the same direction as the motion). Illustrative desired force profile 904 includes two portions, one corresponding to motion of the translator in a first direction, and the other corresponding to motion of the translator in the opposite direction. As compared to desired force profile 902, desired force profile 904 is continuous, including multiple values rather than two values. Illustrative desired force profiles 902 and 904 may be used, for example, in arrangements where the multiphase electromagnetic machine is coupled to a piston engine (e.g., the translator is rigidly coupled to a piston assembly) having gas springs (or any other suitable springs such as mechanical springs or hydraulic springs) to slow the translator/piston assembly at either end (i.e., near position 0 or L). Illustrative desired force profile 906 is a linear function of position x. Illustrative desired force profile 906 may be used, for example, in arrangements where the multiphase electromagnetic machine is used to as a spring (e.g., a "virtual spring" implemented by the control system and multiphase electromagnetic machine). In a further example, illustrative desired force profile 906 may be used in arrangements where the multiphase electromagnetic machine is coupled to a piston engine (e.g., the translator is rigidly coupled to a piston assembly) having no springs (or any other suitable springs such as mechanical springs or hydraulic springs), or insufficient springs, to slow the translator/piston assembly at either end (i.e., near position 0 or L). A desired force profile may be specified by a user, recalled form a lookup table based on or more inputs, determined based on a model, determined based on a function, generated using any other suitable technique, or any combination thereof. A desired force profile may be application dependent, and may exhibit different properties accordingly for two different applications. Plot 950 shows illustrative velocity profile 952 of a translator relative to a stator. Velocity profile 952 exhibits zeros at two axial positions, 0 and L, corresponding to the limits of translator travel where the translator may change direction. In some embodiments, a control system may measure or reference a velocity profile and a desired force profile to determine a desired force. In some embodiments, an encoder may be used to determine a relative position of a translator and a stator, which may be used to determine a desired force value, a velocity value, or both. In some embodiments, a desired velocity profile may be predetermined, and an actual velocity profile may be determined (e.g., using an encoder). Accordingly the control system may determine a desired force value to increase agreement between the desired and actual velocity profiles.

The force interaction F between a multiphase translator and stator system may be described by Eq. 1:

$$F(x) = \sum_{j=1}^{N} k_j(x, \Phi_T) i_j \qquad (1)$$

in which N is the number of phases, $i_j$ is the current in each phase indexed by index j, x is a spatial position variable, $\phi_T$ is the magnetic flux in the translator, and $k_j(x,\phi_T)$ are a set of N characteristic force constants, corresponding to the N phases, that may depend on position x. In some embodiments, the translator flux $\phi_T$ may be assumed constant (e.g., for a permanent magnet machine), and accordingly need not be explicitly determined. In some embodiments, the translator flux $\phi_T$ may be determined using a formula or a look-up table based on temperature-dependent B-H curves (e.g., for a permanent magnet machine). In some embodiments, the translator flux may be calculated based on previous measured current values, using a translator flux model (e.g., for an induction machine). As shown by Eq. 1, the force F(x) is a combination of the forces from each phase (i.e., force constant multiplied by current). The force may be applied to the translator by providing currents (e.g., to drive the translator), applied by the translator to generate currents (e.g., during electric power generation), or a combination thereof. In some embodiments, one or more characteristics of a multiphase electromagnetic machine, such as the $k_j(x,\phi_T)$ values, may be determined. For example, a translator may be driven by controlling force, position, velocity, or a combination thereof. An encoder may be used to determine the positive x of the translator relative to the stator, and the velocity $\dot{x}$ (e.g., by calculating a time derivative using any suitable analytical or numerical differentiation technique). At each desired position x, the electromotive force (emf) in each phase $V_j(x)$ may be measured by a voltage sensor (e.g., a voltmeter). Shown in Eq. 2:

$$V_j(x) = k_j(x, \phi_T)\dot{x} \qquad (2)$$

is an illustrative expression relating the emf $V_j(x)$ in phase j, velocity $\dot{x}$, and force constant $k_j(x,\phi_T)$ of phase j, at position x. Both sides of Eq. 2 may be integrated in time, as shown by Eq. 3:

$$\Phi_j \int V_j dt = \int k_j(x, \Phi_T)\dot{x}dt \qquad (3)$$

giving an expression relating flux $\phi_j$ in each phase j to position and force constant $k_j(x,\phi_T)$. The force constants $k_j(x,\phi_T)$ for each phase may be determined, at each position, using Eq. 4:

$$\frac{\delta\Phi_j}{\delta x} = k_j(x, \Phi_T) \qquad (4)$$

where the partial derivative of the flux $\phi_j$ of a particular phase with respect to position is equal to the force constant $k_j(x,\phi_T)$ for that phase. For example, the emf may be numerically integrated in time to give a sequence of flux values, and a function (e.g., analytic, piecewise, or otherwise) may be fit to the flux values, and differentiated with respect to position to yield with force constants. In some embodiments, the set of force constants may be stored in memory of the control system, memory accessible to the control system, or a combination thereof. It will be understood that Eqs. 1-3 are illustrative expressions that may be used to determine a set of force constants, but any suitable analytical technique (e.g., modeling), empirical technique, or a combination thereof may be used to determine a set of force constants, in accordance with the present disclosure.

Figure 10:
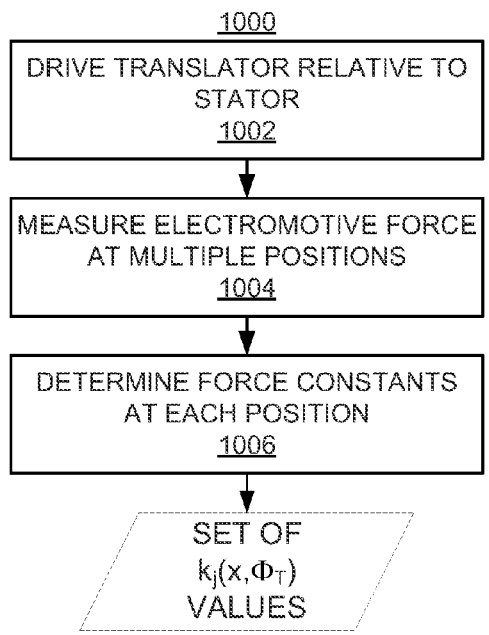
FIG. 10 is a flow diagram of illustrative steps for determining force constant values, in accordance with some embodiments of the present disclosure.

FIG. 10 is a flow diagram 1000 of illustrative steps for determining force constant values, in accordance with some embodiments of the present disclosure.

Step 1002 may include driving a translator relative to a stator. In some embodiments, an encoder may be used to determine an axial position of the translator relative to the stator while the translator is driven.

Step 1004 may include a control system measuring the electromotive force in one or more phases j at multiple positions of the translator relative to the stator during the driving of step 1002. In some embodiments a current sensor such as a current clamp, reference resistor, Hall Effect sensor, any other suitable current sensor, or any combination thereof may be used by the control system to measure the one or more currents.

Step 1006 may include the control system determining one or more force constants $k_j(x,\phi_T)$ for phase j at each position x of the multiple positions of step 1004. In some embodiments, the control system may implement Eq. 4 to determine the force constants from the measured electromotive force of step 1004 and known position of step 1002. In some embodiments, the control system may store the determined force constants in a database, an array of values, or other data structure that may be accessed by processing equipment of the control system. In some embodiments, the illustrative steps of flow diagram may be performed using a system other than a control system. For example, a test stand, which may include suitable processing equipment and sensors, may be used to perform the illustrative steps of flow diagram 1000.

In some embodiments, a control system may use one or more objective functions (e.g., one or more cost functions) to determine a set of current values. An objective function may represent a system cost such as, for example, ohmic losses from current flow in one or more conductors, IGBT losses, force deviations from a desired force, any other suitable cost, or any combination thereof, or a system benefit. It will be understood that although the discussion below references cost functions, which are typically minimized, utility functions, which are typically maximized, may also be used. Any suitable objective function may be optimized (e.g., minimized or maximized) in accordance with the present disclosure. For example, an objective function C may be expressed using Eq. 5:

$$C = \sum_{j=1}^{N} i_j^2 R_j \quad (5)$$

in which $i_j$ is the current in phase j of N phases, and $R_j$ is the characteristic resistance corresponding to phase j (e.g., which may be, but need not be, different for each phase). The control system may implement the objective function of Eq. 4 to minimize ohmic resistance losses. In a further example, an objective function C may be expressed using Eq. 6:

$$C = \sum_{j=1}^{N} |i_j| V_{ce-IGBT,j} \quad (6)$$

in which is the current in phase j of N phases, and $V_{ce-IGBT,j}$ is the on-state voltage drop corresponding to phase j (e.g., which may be, but need not be, different for each phase). In a further example, an objective function C may be expressed using Eq. 7:

$$C = \sum_{j=1}^{N} i_j^2 R_{MOSFET,j} \quad (7)$$

in which is the current in phase j of N phases, and $R_{MOSFET,j}$ is the characteristic metal oxide semiconductor field effect transistor (MOSFET) resistance corresponding to phase j (e.g., which may be, but need not be, different for each phase). The control system may implement the objective functions of Eq. 6 or Eq. 7 to minimize IGBT or MOSFET losses, respectively. In a further example, an objective function C may be expressed using Eq. 8:

$$C = |F_{des} - F_{act}| \quad (8)$$

in which $F_{des}$ is the desired force, and $F_{act}$ is the actual force. The control system may implement the objective function of Eq. 8 to minimize deviation of an actual force from the desired force. In a further example, an objective function C may be expressed using either of Eqs. 9 or 10:

$$C = \sum_{j=1}^{N} i_j^2 R_j + |i_j| V_{ce-IGBT,j}, \quad (9)$$

$$C = \sum_{j=1}^{N} i_j^2 (R_j + R_{MOSFET,j}) \quad (10)$$

in which $i_j$ is the current in phase j of N phases, $R_j$ is the characteristic resistance corresponding to phase j, $V_{ce-IGBT,j}$ is the on-state voltage drop corresponding to phase j, and $R_{MOSFET,j}$ is the characteristic MOSFET resistance corresponding to phase j. The control system may implement the objective function of Eqs. 9 or 10 to minimize the total losses due to ohmic resistance losses and IGBT losses, or the total losses due to ohmic resistance losses and MOSFET losses, respectively.

In some embodiments, relatively more complex model of power subsystem losses, electromagnetic machine losses (e.g., magnet losses, models of iron cores), or both, may be used as an objective function. In some embodiments, one or more objective functions may be combined to generate a new objective function. For example, a weighted sum of two objective functions may be used as an objective function. It will be understood that while Eqs. 5-10 provide illustrative examples of objective functions, any suitable objective function may be used in accordance with the present disclosure.

In some embodiments, thermal information such as, for example, a temperature measurement, may be used with an objective function. For example, system properties (e.g., $R_j$, $V_{ce-IGBT,j}$, $R_{MOSFET,j}$) may be expressed as temperature dependent quantities (e.g., using temperature dependent resistivity, or a user-specified temperature dependence). In a further example, system losses may be weighted by a temperature dependent coefficient. For example, phases operating at relatively higher temperatures (e.g., near their operating envelope limits) may have their associated resistances and/or losses weighted relatively more heavily to decrease the current allocated to such phases. In a further example, losses associated with the phase exhibiting the highest temperature may be penalized with a weighting relative to the other phases.

In some embodiments, the objective function may be subject to one or more constraints. A constraint may include a condition (e.g., an equality or inequality) to be satisfied during optimization. For example, a constraint may be expressed using Eq. 11:

$$F_{DES} = \sum_{j=1}^{N} k_j(x, \Phi_T) i_j \quad (11)$$

in which $i_j$ is the current in phase j of N phases, $k_j(x,\phi_T)$ is the force constant corresponding to phase j at position x, and $F_{DES}$ is the desired force equal to the sum of electromotive forces from each phase. The control system may implement the constraint of Eq. 11 to ensure the desired force is achieved. In a further example, a constraint may be expressed using Eq. 12:

$$K = \sum_{j=1}^{N} i_j \quad (12)$$

in which $i_j$ is the current in phase j of N phases. The control system may implement the constraint of Eq. 12 to constrain the total current to be a predetermined value K (e.g., zero) to reduce excess current. In a further example, a constraint may be expressed using Eq. 13:

$$i_{j,min} < i_j < i_{j,max} \tag{13}$$

in which $i_j$ is the current in phase j of N phases, $i_{j,max}$ is a maximum current threshold, and $i_{j,min}$ is a minimum current threshold for phase j. The control system may implement the constraint of Eq. 13 to constrain the current in any phase to be within a predetermined range (e.g., −100 to 100 amps or any other suitable range). In a further example, a constraint may be expressed using Eq. 14:

$$l = i_j \tag{14}$$

in which $i_j$ is the current in phase j of N phases, and l is a predetermined constant. The control system may implement the constraint of Eq. 14 to constrain the current of one or more phases to a fixed value (e.g., zero or any other suitable value). Shown in Eq. 15:

$$0 = i_j \tag{15}$$

is a particular case of Eq. 14, in which the predetermined value is zero. In a further example, a constraint may be expressed using Eq. 16:

$$V_{j,min} < V < V_{j,max} \tag{16}$$

in which $V_j$ is the voltage across phase j of N phases, $V_{j,max}$ is a maximum available voltage for phase j, and $V_{j,min}$ is a minimum available for phase j (e.g., thresholds may be, but need not be, different for each phase). In some embodiments, the available voltages for each phase may be determined based on the high and low voltage bus lines available in the power subsystem. In a further example, the constraint of Eq. 16 may be expressed in terms of current values using Eq. 17:

$$\Delta i_{j,min} < \Delta i_j < \Delta i_{j,max} \tag{17}$$

in which $\Delta i_j$ is the change in current (e.g., in time, sample number, or any other suitable increment) in phase j of N phases, $\Delta i_{j,max}$ is a maximum change in current threshold, and $\Delta i_{j,min}$ is a minimum current threshold for phase j (e.g., thresholds may be, but need not be, different for each phase). The control system may implement the constraint of Eq. 13 to constrain the change in current of one or more phases to a predetermined range. The range may be determined based on the inductive limitations of each phase. Shown in Eq. 18:

$$\left(\frac{di_j}{dt}\right)_{min} < \frac{di_j}{dt} < \left(\frac{di_j}{dt}\right)_{max} \tag{18}$$

is a further constraint, similar to that shown in Eq. 17, in which the derivative of the current in each phase $di_j/dt$ is constrained to a range between a minimum value $(di_j/dt)_{min}$ and maximum value $(di_j/dt)_{max}$ (e.g., which may be, but need not be, different for each phase). The control system may implement the constraint of Eq. 18 to constrain the voltage drop across the windings of one or more phases to a predetermined range. Shown in Eq. 19:

$$V_{j,min} < i_j R_j + L_j \frac{di_j}{dt} + k_j(x, \Phi_T) i_j < V_{max,j} \tag{19}$$

is a further constraint in which the voltage drop $$i_j R_j + L \frac{di_j}{dt} + k_j(x, \Phi_T) i_j,$$

$k_j(x,\phi_T)i_j$, where $L_j$ is the winding inductance of phase j (e.g., which may be, but need not be, different for each phase), in each phase is limited by predetermined voltages $V_{max,j}$ and $V_{j,min}$ (e.g., maximum and minimum voltage differences available between bus lines, or a bus line and neutral, per each phase). The control system may implement the constraint of Eq. 19 to constrain the voltage drop across the windings and resistive elements of one or more phases to a predetermined range. It will be understood that while Eqs. 11-19 provide illustrative examples of constraints, any suitable constraint may be used in accordance with the present disclosure.

In some embodiments, the control system may optimize one or more objective functions, each subject to one or more constraints. The control system may implement the optimization using any suitable technique such as, for example, Newton's method, a gradient descent/ascent technique, an interior point technique, a simplex technique, a Lagrangian multiplier technique, any other suitable optimization techniques, or any combination thereof. Any suitable technique, including any mathematical manipulation of an objective function or constraint, may be used to solve for a set of current values. For example, in some embodiments, the control system may use zero objective functions, and generate a feasibility function by specifying an objective function value (i.e., essentially converting the objective function into a constraint) and one or more constraints. The control system may determine a set of current values for a series of feasibility functions.

Figure 11:
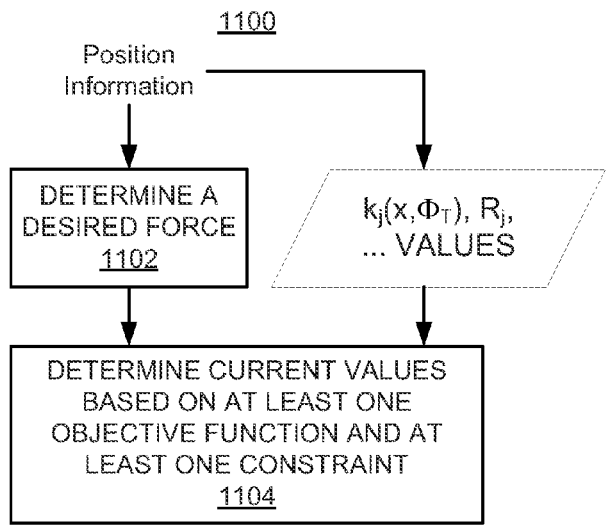
FIG. 11 is a flow diagram of illustrative steps for determining current values, in accordance with some embodiments of the present disclosure.

FIG. 11 is a flow diagram 1100 of illustrative steps for determining current values, in accordance with some embodiments of the present disclosure.

Step 1102 may include a control system determining a desired force between a translator and stator of multiphase electromagnetic machine. In some embodiments the control system may determine a relative position between the translator and stator (e.g., using a position sensor), and determine the desired force based on the relative position. For example, the control system may reference a look-up table for a particular position, and select a corresponding desired force value. In some embodiments the control system may determine a relative velocity between the translator and stator (e.g., using the time derivative of position determined by a position sensor), and determine the desired force based on the relative velocity. For example, the control system may reference a look-up table for a particular velocity, and select a corresponding desired force value. In some embodiments the control system may receive a user input (e.g., via a user interface device) indicating a desired force value. The determined force may have any suitable units such as, for example, Newtons, pounds, pascals, any other suitable units, or any combination thereof.

Step 1104 may include the control system determining current values based on the desired force of step 1102, at least one objective function, and at least one constraint. In some embodiments, the control system may optimize the at least one objective function subject to the at least one constraint. In some embodiments, one of the at least one constraints includes the constraint given by Eq. 8, based on the desired force of step 1102. The control system may recall any suitable information (e.g., data, predetermined values) such as, for example, force constants, phase resistances, IGBT on-state voltage drops, winding inductances, threshold values, previous current values, any other suitable information, or any combination thereof. In some embodiments, the control may store the current values as an array or other suitable data structure. In some embodiments, the control system may input the current values to a pulse width modulation (PWM) controller, which may provide PWM signals to a power subsystem coupled to the multiphase electromagnetic machine.

In some circumstances, one or more phases of a multiphase electromagnetic machine may be determined to be damaged, degraded, unavailable, undesired, or may be otherwise afforded special consideration by a corresponding control system. For example, a winding may become shorted by a failure of electrical insulation, and accordingly the electrical properties of the winding may change significantly. In some embodiments, a control system may apply particular constraints to one or more particular phases to prevent further damage, prevent overly large currents, prevent instability, or otherwise control operation of the electromagnetic machine with respect to the particular phase.

Figure 12:
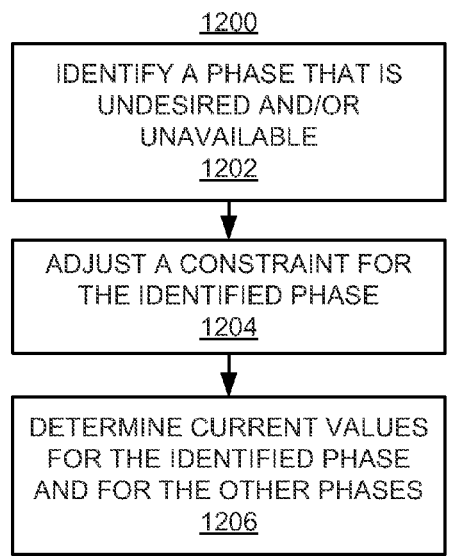
FIG. 12 is a flow diagram of illustrative steps for determining current values when a phase is undesired or unavailable, in accordance with some embodiments of the present disclosure.

FIG. 12 is a flow diagram of illustrative steps for determining current values when a phase is undesired or unavailable, in accordance with some embodiments of the present disclosure.

Step 1202 may include a control system identifying one or more phases that are undesirable, unavailable, or both. For example, a particular phase of a multiphase electromagnetic machine may become compromised during operation (e.g., by insulation breakdown of a winging, mechanical damage, IGBT damage, or other damage). In a further example, the control system may control the multiphase electromagnetic machine using less than the N available phases. In some embodiments, the control system may perform a diagnostic check to determine whether any phase has been compromised. For example, the control system may measure the impedance of a phase, and if the impedance is outside of a predetermined range, the phase may be deemed compromised. In some embodiments, the control system may receive a user input (e.g., using a user interface device), indicating that one or more phases requires special consideration.

Step 1204 may include the control system adjusting a constraint for the identified one or more phases of step 1202. In some embodiments, the control system may, for example, constrain the current for the one or more phases to a particular range, or to a predetermined value (e.g., a value of zero or any other suitable value). For example, the control system may receive a user input to a hard command button of a keyboard, indicating that a particular phase is unavailable, and the current should be constrained to zero for that phase. In a further example, the control system may determine that a phase has been compromised, and may accordingly constrain the current in the phase to be zero. In a further example, the control system may determine that one or more windings have been damaged, and may adjust the desired force in response (e.g., reduce the desired force to prevent increased current demands in the other phases).

Step 1206 may include the control system determining current values for the one or more identified phases of step 1202 and one or more of the other phases of the multiphase electromagnetic machine. In some embodiments, step 1206 may include any of the techniques of step 1104 of FIG. 11. For example, the control system may optimize one or more cost functions, subject to one or more constraints including the adjusted constraint of step 1204. In some embodiments, the control system may store the current values as an array or other suitable data structure. In some embodiments, the control system may input the current values to a PWM controller, which may provide PWM signals to a power subsystem coupled to the multiphase electromagnetic machine.

Figure 13:
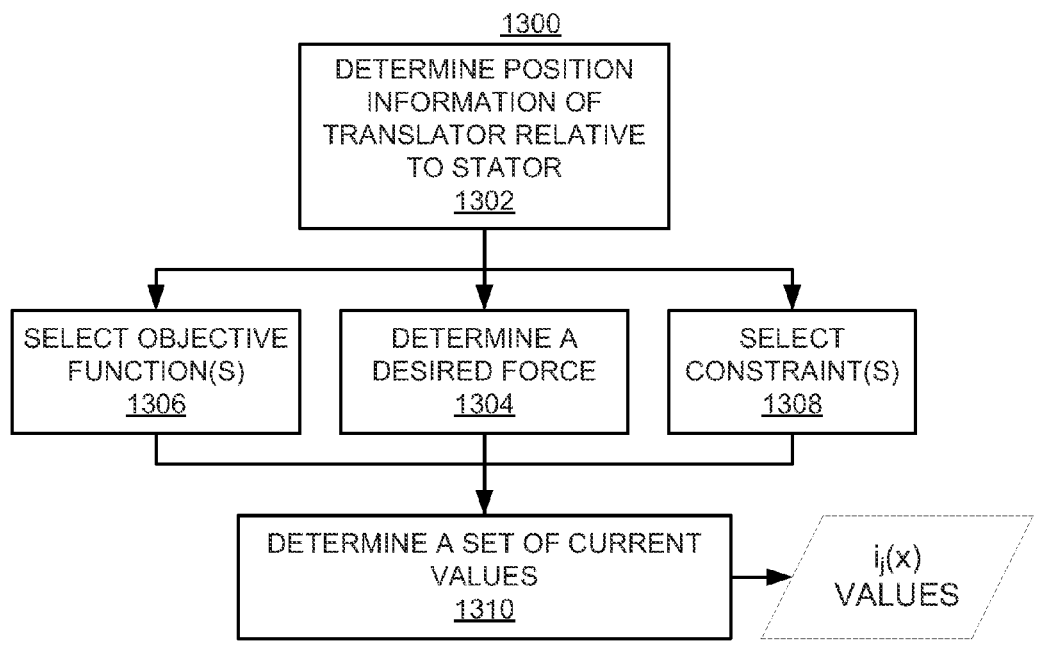
FIG. 13 is a flow diagram of illustrative steps for determining a set of current values based on a cost function and one or more constraints, in accordance with some embodiments of the present disclosure.

FIG. 13 is a flow diagram 1300 of illustrative steps for determining a set of current values based on an objective function and one or more constraints, in accordance with some embodiments of the present disclosure.

Step 1302 may include a control system determining position information of a translator relative to a stator. Position information may include an axial position of the translator relative to the stator, an axial velocity of the translator relative to the stator, a direction of motion of the translator relative to the stator, an acceleration of the translator relative to the stator, any other suitable position information, or any combination thereof. The control system may receive a signal from one or more sensors such as, for example, a linear encoder, a rotary encoder, an accelerometer, a Doppler system, an image-based position sensor, any other suitable sensor for sensing position information, or any combination thereof. In some embodiments, position information may be determined by performing calculations using sensor output. For example, an encoder may sense a linear position, from which velocity, direction of motion, acceleration, or a combination thereof may be derived by calculating first and second derivatives. In a further example, an accelerometer may sense a linear acceleration, from which position, direction of motion, velocity, or a combination thereof may be derived by performing one or two time integrals.

Step 1304 may include the control system determining a desired force between a translator and stator of multiphase electromagnetic machine. In some embodiments, the control system may determine the desired force based on the position information of step 1302. For example, the control system may reference a look-up table for a particular position, and select a corresponding desired force value. In a further example, the control system may reference a look-up table for a particular determined velocity, and select a corresponding desired force value. In a further example, the control system may reference a look-up table for a particular direction of motion, and select a corresponding desired force value. In some embodiments the control system may receive a user input (e.g., via a user interface device) indicating a desired force value.

Figure 14:
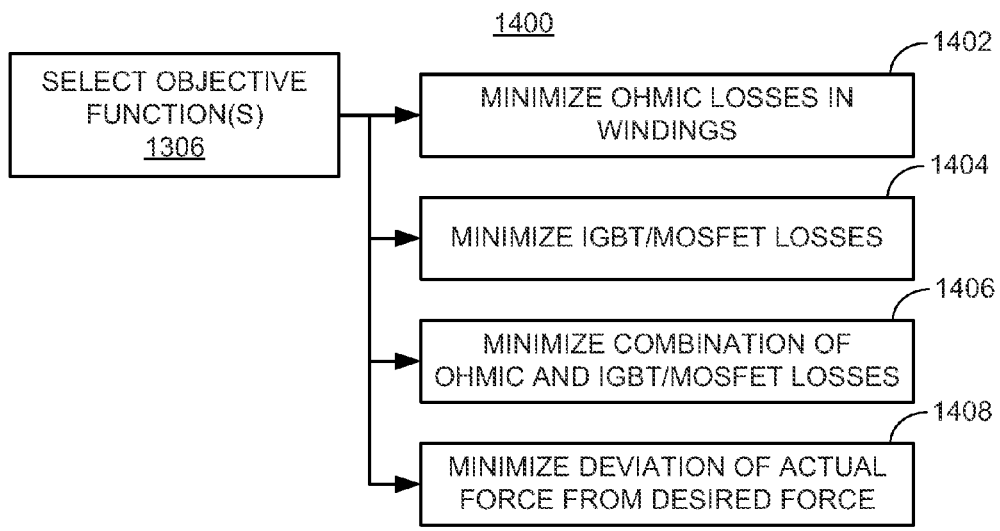
FIG. 14 is a flow diagram of illustrative steps for selecting an objective function, in accordance with some embodiments of the present disclosure.

Step 1306 may include the control system selecting at least one objective function. In some embodiments, more than one objective function may be available, and the control system may select one or more objective functions. In some embodiments, only one objective function may be available, in which case, step 1306 need not be performed. In some embodiments, the control system may select the at least objective function based on a desired operating characteristic. The at least one objective function may include any objective function expressed in Eqs. 5-10, any other suitable objective function, or any combination thereof. FIG. 14 is a flow diagram 1400 of illustrative steps for selecting an objective function, in accordance with some embodiments of the present disclosure. In some embodiments, the control system may select an objective function to minimize ohmic losses in phase windings, other current paths, or both (e.g., using Eq. 5), as shown by step 1402. In some embodiments, the control system may select an objective function to minimize IGBT losses in a power subsystem (e.g., using Eq. 6), as shown by step 1404. In some embodiments, the control system may select an objective function to minimize a combination of ohmic losses and IGBT losses in phase windings (e.g., using Eq. 9), as shown by step 1406. In some embodiments, the control system may select an objective function to minimize a deviation between a desired force and an actual force (e.g., using Eq. 8), as shown by step 1408.

Figure 15:
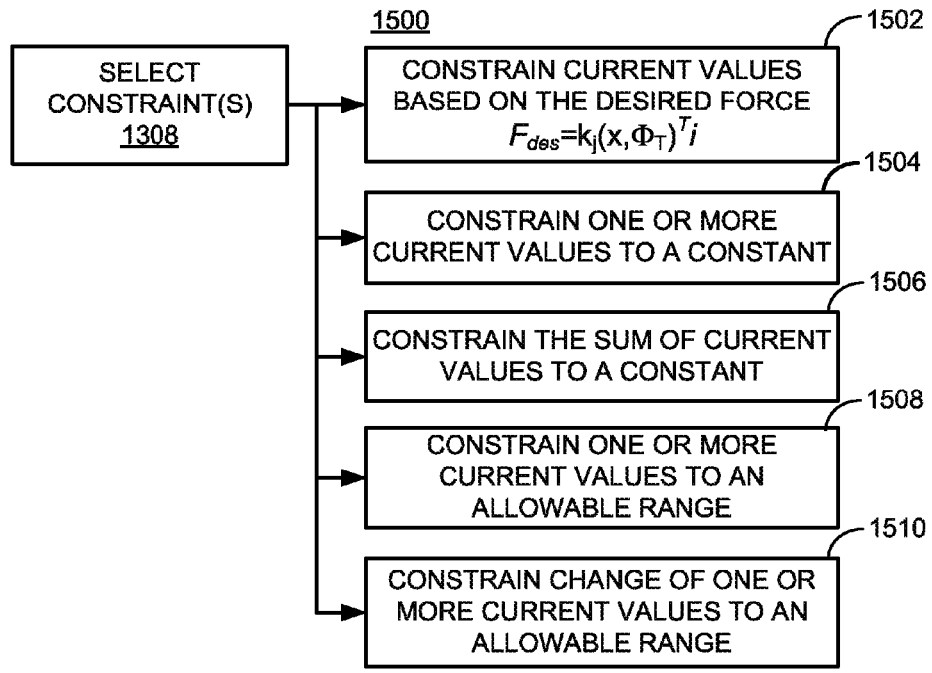
FIG. 15 is a flow diagram of illustrative steps for selecting a constraint, in accordance with some embodiments of the present disclosure.

Step 1308 may include the control system selecting at least one constraint. In some embodiments, more than one constraint may be available, and the control system may select one or more constraints. In some embodiments, only one constraint may be available, in which case, step 1308 need not be performed. In some embodiments, the control system may select the at least constraint based on a desired operating characteristic. The at least one constraint may include any constraint expressed in Eqs. 11-19, any other suitable constraint, or any combination thereof. FIG. 15 is a flow diagram 1500 of illustrative steps for selecting a constraint, in accordance with some embodiments of the present disclosure. In some embodiments, the control system may select to constrain the set of current values based on the desired force (e.g., using Eq. 11), as shown by step 1502. In some embodiments, the control system may select to constrain one or more current values to a predetermined value (e.g., using Eq. 14), as shown by step 1504. In some embodiments, the control system may select to constrain the sum of a set of current values to a constant value (e.g., using Eq. 12), as shown by step 1506. In some embodiments, the control system may select to constrain one or more current values to an allowable range (e.g., using Eq. 103), as shown by step 1508. In some embodiments, the control system may select to constrain a change in one or more current values to an allowable range (e.g., using Eq. 17), as shown by step 1510.

Step 1310 may include the control system determining a set of current values based on the desired force of step 1304, the at least one objective function of step 1306, and the at least one constraint of step 1308. In some embodiments, the control system may implement an optimization technique to determine the set of current values. In some embodiments, the control system may optimize (e.g., maximize or minimize) a cost function, utility function, or both, as shown in Eq. 20:

$$C = f(F_{DES}, F_{ACT}, k_j(x, \phi_T), i_j, \Delta i_j, di_j/dt, x, \dot{x}, \ddot{x}, \phi_T, R_j, V_{ce\text{-}IGBT,j}, R_{MOSFET,j}, L_j) \quad (20)$$

which may be a function of a desired force $F_{DES}$, an actual force $F_{ACT}$, one or more force constants $k_j(x, \phi_T)$, one or more current values $i_j$, one or more changes in current values $\Delta i_j$, one or more derivative of current values $di_j/dt$, a position x, a velocity $\dot{x}$, an acceleration $\ddot{x}$, a flux $\phi_T$, a phase resistance $R_j$, an on-state voltage drop $V_{ce\text{-}IGBT,j}$, an effective MOSFET resistance $R_{MOSFET,j}$, an inductance of a phase $L_j$, any other suitable variables, or any combination thereof. The control system may optimize the objective function subject to one or more constraints which may include equalities, as shown in Eq. 21:

$$K = g(F_{DES}, F_{ACT}, k_j(x, \phi_T), i_j, \Delta i_j, di_j/dt, x, \dot{x}, \ddot{x}, \phi_T, R_j, V_{ce\text{-}IGBT,j}, R_{MOSFET,j}, L_j) \quad (21)$$

inequalities, as shown illustratively in Eq. 22:

$$K_1 \leq g(F_{DES}, F_{ACT}, k_j(x, \phi_T), i_j, \Delta i_j, di_j/dt, x, \dot{x}, \ddot{x}, \phi_T, R_j, V_{ce\text{-}IGBT,j}, R_{MOSFET,j}, L_j) \leq K_2 \quad (22)$$

or both, and may include a desired force $F_{DES}$, an actual force $F_{ACT}$, one or more force constants $k_j(x, \phi_T)$, one or more current values $i_j$, one or more changes in current values $\Delta i_j$, one or more derivative of current values $di_j/dt$, a position x, a velocity $\dot{x}$, an acceleration $\ddot{x}$, a flux $\phi_T$, a phase resistance $R_j$, an on-state voltage drop $V_{ce\text{-}IGBT,j}$, an effective MOSFET resistance $R_{MOSFET,j}$, an inductance of a phase $L_j$, any other suitable variables, or any combination thereof. It will be understood that Eq. 22 shows an illustrative inequality including both a "less than or equal" and a "greater than or equal" symbol, although any suitable inequality (e.g., less than, greater than) may be included as a constraint.

In an illustrative example, a control system may select the objective function shown by Eq. 5, and the constraint shown by Eq. 11. If all of the phase resistances $R_j$ are the same, a set of current values may be determined using Eq. 23:

$$i = k(k^T k)^{-1} F \quad (23)$$

in which i is a column vector of the set of current values $i_j$ of N phases, k is column vector of the force constants $k_j(x, \phi_T)$ of the N phases (e.g., based on position and flux), and F is a 1×1 array (i.e., a scalar) having a value equal to the desired electromotive force $F_{des}$ between the stator and the translator. As shown in Eq. 23, this particular selection of objective function and constraint allows a least norm solution. If the phase resistances are not equal, for example, the control system may determine a weighted least norm solution (e.g., by using a weighted current variable, and then transforming to current). If, additionally, the sum of the currents were constrained to zero, for example, Eq. 23 may still be used, although the arrays k and F are defined differently. For example, k is a N×2 array with the first column all ones, and the second column the set of force constants. Accordingly, F would be a 2×1 array, with the top row having a value of zero, and the bottom row having a value $F_{des}$. A least norm solution, or weighted least norm solution, may be achieved, for example, when a suitable quadratic objective function (e.g., as shown in Eqs. 5, 7, and 10) and affine equality constraint(s) (e.g., as shown by Eqs. 11, 12, and 14) are used.

Figure 16:
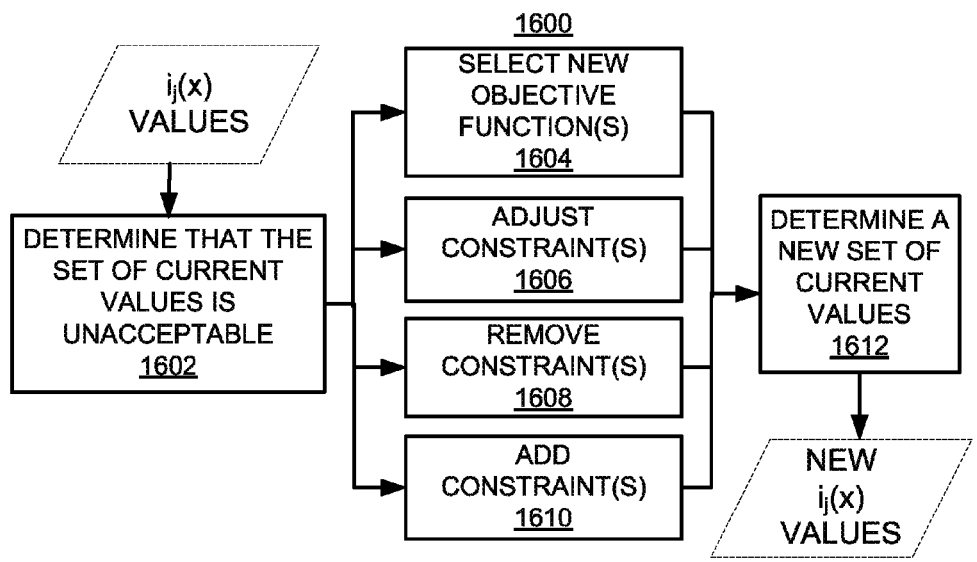
FIG. 16 is a flow diagram of illustrative steps for determining a new set of current values based on an objective function and one or more constraints, in accordance with some embodiments of the present disclosure.

In some circumstances, the control system may determine that a set of current values may be unacceptable (e.g., may violate one or more constraints, may correspond to a non-converged solution). For example, processing equipment of the control system may fail to reach an acceptable solution to the optimization (e.g., while performing the illustrative steps of flow diagram 1300 of FIG. 13). In a further example, no acceptable solution may exist for the selected at least one objective function and at least one constraint. In some embodiments, the control system may recognize that unacceptable current values have been determined, and determine a new set of current values. FIG. 16 is a flow diagram 1600 of illustrative steps for determining a new set of current values based on a cost function and one or more constraints, in accordance with some embodiments of the present disclosure.

Step 1602 may include the control system determining that a set of current values is unacceptable. In some embodiments, the control system may perform a check on a set of determined current values to ensure that all constraints have been satisfied. In some embodiments, the control system may determine that a solution approach is not converging to an acceptable solution. In some embodiments, the control system may receive a user input indicating that a determined set of current values are unacceptable.

If the control system determines at step 1602 that a set of current values is not acceptable, then the control system may perform any or all of steps 1604-1610.

Step 1604 may include the control system selecting at least one new objective function. In some embodiments, the control system may select an additional objective function to optimize along with the previous objective function. In some embodiments, the control system may replace one or more objective functions with at least one new objective function. The control system may select any of the objective functions included in FIG. 14, any other suitable objective functions, or any combination thereof.

Step 1606 may include the control system adjusting at least one constraint. In some embodiments, the control system may adjust (e.g., decrease or increase) a threshold used with a constraint (e.g., a threshold included in an inequality). For example, step 1606 may include the control system adjusting a desired force value. The control system may reduce the desired force, which may reduce current flows in one or more phases. In a further example, the control system may determine that a desired force will likely not be achievable (e.g., due to damage, or other factors), and may accordingly reduce the desired force. In some embodiments, the control system may relax an equality constraint to an inequality constraint to allow a wider range of acceptable values.

Step 1608 may include the control system removing at least one constraint. In some embodiments, the control system may remove a constraint to aid in achieving a solution of an optimization. In some embodiments, the control system may remove a constraint for all phases. In some embodiments, the control system may remove a constraint for a particular phase or combination of phases, while maintaining the constraint for the remaining phases.

Step 1610 may include the control system adding at least one constraint. In some embodiments, the control system may add a constraint to aid in achieving a solution of an optimization. In some embodiments, the control system may add a constraint for all phases. In some embodiments, the control system may add a constraint for a particular phase or combination of phases. In some embodiments, the control system may replace a constraint with a new constraint, thus removing the old constraint and adding a new constraint. In some embodiments, if a new objective function is selected, one or more new constraints may be added. For example, if an original objective function severely penalized large currents (e.g., via weighting), the selection of a new objective function that does not penalize large current values may benefit from the addition of a constraint on the allowable current values (e.g., using Eq. 13).

Figure 17:
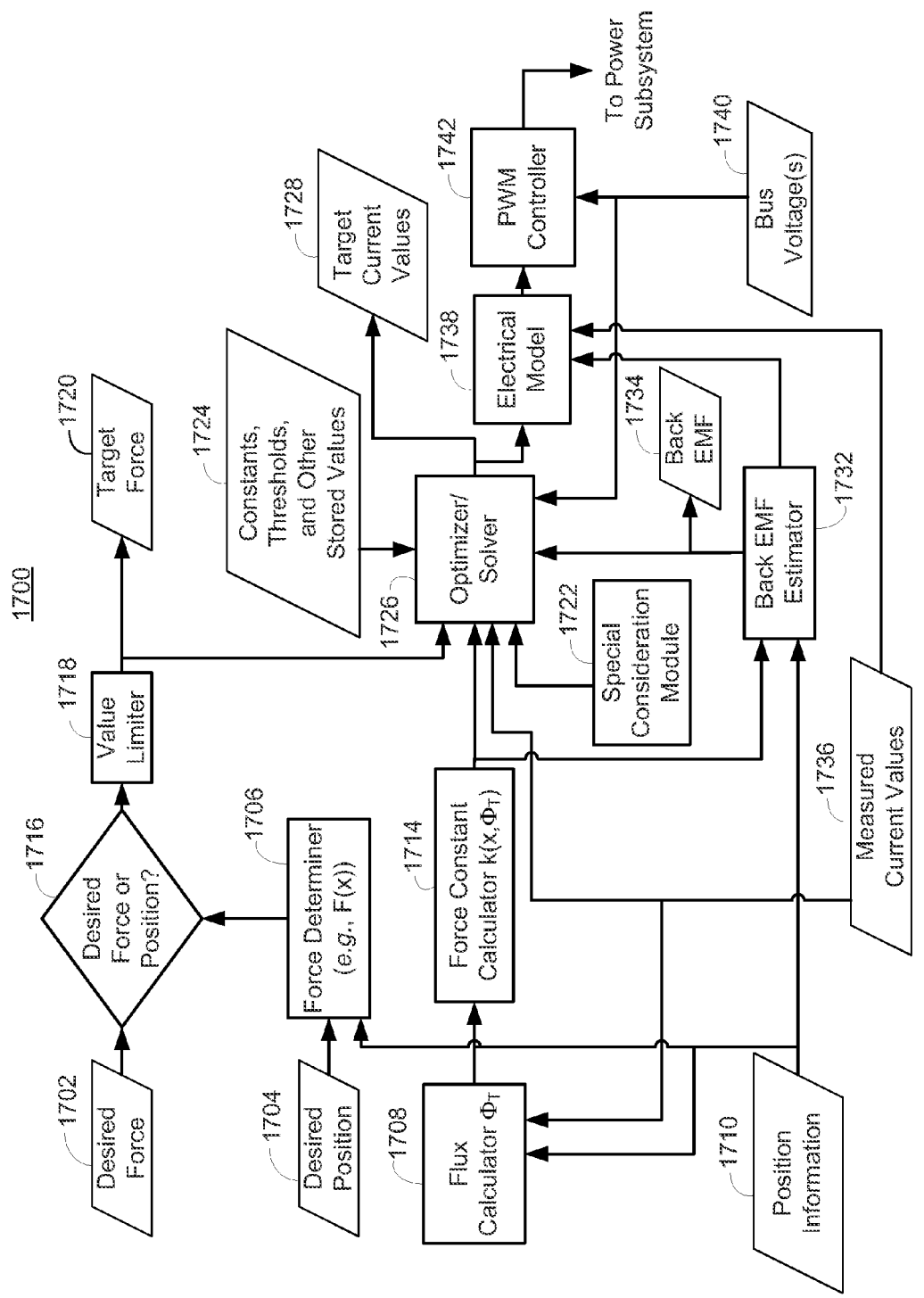
FIG. 17 is a block diagram of illustrative modules for controlling a multiphase electromagnetic machine, in accordance with some embodiments of the present disclosure.

FIG. 17 is a block diagram 1700 of illustrative modules of a control system for controlling a multiphase electromagnetic machine, in accordance with some embodiments of the present disclosure. Block diagram 1700 may be implemented, for example, using any suitable hardware modules, software modules, or a combination thereof. For example, block diagram 1700 may implemented with a control system such as control system 500 of FIG. 5. Block 1716 may include processing equipment determining whether to use a desired force, or a desired position as input. A desired force between a stator and a translator of multiphase electromagnetic machine may be recalled from memory, determined by a processing block, or both, as shown by data block 1702. A desired position between a stator and a translator of multiphase electromagnetic machine may be recalled from memory, determined by a processing block, or both, as shown by data block 1704. The desired position may be used at block 1706 to determine a desired force based on a mechanical model (e.g., desired force solved from desired position as input), a PID controller (e.g., which may use a measured position shown by data block 1710), a cogging force calculator, and other suitable, calculator any other suitable module, or any combination thereof. The desired force value outputted from block 1716 may be limited (e.g., capped by upper and lower thresholds) or otherwise adjusted (e.g., filtered, averaged) by block 1718. Block 1718 may output a target force value (e.g., shown by data block 1720, and which may be the same as a desired force value), which may be used to determine a set of current values. Block 1708, which may be used for any suitable multiphase electromagnetic machine (e.g., inductive, permanent magnet, switch reluctance), may determine a magnetic flux in the translator (e.g., using a model, look-up table, or other reference) based on previous current values, translator properties, stator properties, B-H curves, any other suitable information, or any combination thereof. For example, referencing a permanent magnet machine, block 1708 may take as input measured or estimated magnet temperatures to estimate flux. In a further example, referencing an inductive machine, block 1708 may take as input the history of applied phase currents and voltages. A measured position of the translator relative to the stator, shown by data block 1710, may be used at block 1714 to recall a set of force constants. Position information (e.g., position, velocity, acceleration, or manipulations/conversions thereof) of the translator relative to the stator may be used at block 1708 to determine one or more flux values, and determine a set of force constants (e.g., which may be used for an induction-type electromagnetic machine). Block 1722 may determine whether any phases require special consideration (e.g., damaged, undesired, or unavailable phases), and determine any suitable corresponding constraints. Block 1726 may include an optimizer/solver module to determine a set of current values, as shown by data block 1728, based on a target force (e.g., data block 1720), force constants (e.g., from block 1708 or block 1714), any constraints from block 1722, and any constants, thresholds, or other stored values (e.g., as shown by data block 1724). Block 1732 may estimate a back emf, shown by data block 1734, from one or more phases based on the measured position (e.g., as shown by data block 1710), and a set of force constants (e.g., from block 1708 or 1714). Block 1738 may take as input the set of current values determined by block 1726, the back emf determined by block 1732, and the previous set of current values shown by data block 1736 (e.g., from the previous iteration), and output a set of voltage values for the phases of the electromagnetic machine. Block 1726 may, for example, apply any of the illustrative techniques of flow diagrams 1100-1600 of FIGS. 11-16 to determine a set of current values. Block 1742 may take as input the set of voltage values from block 1736 and the available bus and ground voltages (e.g., as shown by data block 1740), and determine PWM duty cycles, which may be outputted to a power subsystem (e.g., one or more IGBTs) of the control system. The blocks shown in block diagram may perform one full calculation (e.g., taking a desired force or position, along with position information, and determining PWM duty cycles) at any suitable speed. For example, processing equipment of a control system may perform full calculations at a rate of 10 kHz.

Figure 18:
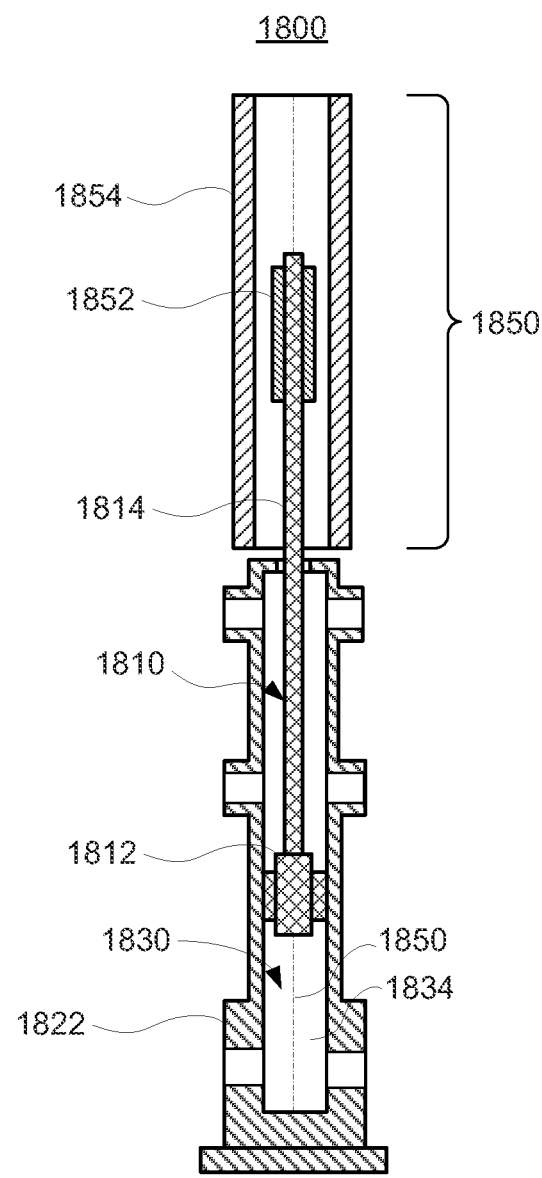
FIG. 18 is a cross section view of an illustrative piston engine including an illustrative multiphase electromagnetic machine, in accordance with some embodiments of the present disclosure.

FIG. 18 is a cross section view of an illustrative piston engine 1800 including an illustrative multiphase electromagnetic machine 1850, in accordance with some embodiments of the present disclosure. Piston engine 1800 includes a cylinder 1822 having a bore 1834 and a combustion section 1830, as well as a substantially rigid piston assembly 1810 configured to translate along axis 1850 of bore 1834. In the illustrated embodiment, piston assembly 1810 includes piston 1812, piston rod 1814, translator 1852, although any other suitable components that are not shown, or any combination thereof, may be included.

Combustion, fluid compression, and fluid expansion of an engine fluid may occur in combustion section 1830, with piston assembly 1810 providing mechanical work interactions with the engine fluid. Motion of piston assembly 1810, and specifically translator 1852, relative to the stator 1854 may allow electromagnetic work interactions. For example, electromagnetic work may be extracted from stator 1854 caused by relative motion of translator 1852 (e.g., to extract work from an expansion stroke of piston assembly 1810). In a further example, electromagnetic work may be supplied to stator 1854 to cause relative motion of translator 1852 (e.g., to provide work input during a compression stroke of piston assembly 1810). Multiphase electromagnetic machine 1850 may include a permanent magnet machine, an induction machine, a switched reluctance machine, any other suitable electromagnetic machine, or any combination thereof. For example, translator 1852 may include a permanent magnet, and stator 1854 may include a wire coil which may conduct an induced current generated by the motion of translator 1852. In a further example, translator 1852 may include a conductive assembly without permanent magnets (e.g., having conductive linkages) in which induced currents may flow, and stator

1854 may include a wire coil which may conduct an induced current generated by the motion of translator 1852.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system for controlling a multiphase electromagnetic machine, the system comprising:
    processing equipment configured to determine desired currents to apply to respective phases of the multiphase electromagnetic machine; and
    a power subsystem coupled to the processing equipment and configured to conduct currents to be applied to respective phases of the multiphase electromagnetic machine and to conduct a virtual phase current to be applied to a virtual phase, wherein the currents and the virtual phase current sum to substantially zero.

2. The system of claim 1, wherein the sum of the currents is a non-zero current.

3. The system of claim 1, wherein the phases and the virtual phase are coupled in a wye configuration.

4. The system of claim 1, wherein:
    the virtual phase comprises an electrical resistance;
    the phases comprise respective electrical resistances; and
    the electrical resistance of the virtual phase is less than any of the electrical resistances of the phases.

5. The system of claim 1, wherein the processing equipment is further configured to determine a desired virtual phase current and the power subsystem is further configured to conduct the virtual phase current based on the desired virtual phase current.

6. A method for controlling a multiphase electromagnetic machine, the method comprising:
    determining desired currents to respectively apply to phases of the multiphase electromagnetic machine;
    conducting respective currents to be applied to the phases based on the desired currents;
    determining a desired virtual phase current; and
    conducting a virtual phase current to be applied to a virtual phase based on the desired virtual phase current.

7. The method of claim 6, wherein the sum of the desired currents is a non-zero current.

8. The method of claim 6, wherein determining the desired virtual phase current comprises determining the sum of the desired currents.

9. The method of claim 6, wherein determining the desired currents and determining the desired virtual phase current occurs substantially simultaneously.

10. The method of claim 6, wherein the desired currents and the desired virtual phase current sum to substantially zero.

11. A system for controlling a multiphase electromagnetic machine, the system comprising:
    a power subsystem; and
    processing equipment coupled to the power subsystem and configured to:
        identify at least one phase of multiple phases of the multiphase electromagnetic machine as being undesired or unavailable,
        adjust one or more constraints associated with the at least one phase, and
        determine desired respective currents to apply to the multiple phases by the power subsystem based on the adjusted one or more constraint of the at least one phase.

12. The system of claim 11, wherein the processing equipment is further configured to reduce an allowable current for the at least one phase.

13. The system of claim 11, wherein the processing equipment is further configured to constrain an allowable current for the at least one phase to zero.

14. The system of claim 11, wherein:
    the power subsystem is configured to conduct a virtual phase current to be applied to a virtual phase; and
    the processing equipment is further configured to determine a desired virtual phase current.

15. The system of claim 11, wherein the processing equipment is further configured to adjust a desired force or a desired torque generated by one or more of the phases.

16. A method for controlling a multiphase electromagnetic machine, the method comprising:
    identifying at least one phase of the multiphase electromagnetic machine as being undesired or unavailable;
    adjusting one or more constraints associated with the at least one phase independent of constraints of other phases;
    determining, using processing equipment, desired currents to apply to respective phases of the multiphase electromagnetic machine by the power subsystem based on the adjusted one or more constraints; and
    applying respective currents to the phases based on the desired currents.

17. The method of claim 16, wherein adjusting the one or more constraints comprises reducing the allowable current for the at least one phase.

18. The method of claim 16, wherein adjusting the one or more constraints comprises constraining the allowable current for the at least one phase to zero.

19. The method of claim 16, further comprising:
    determining a desired virtual phase current corresponding to a virtual phase; and
    conducting a virtual phase current to be applied to the virtual phase based on the desired virtual phase current.

20. The method of claim 16, wherein adjusting the one or more constraints comprises adjusting a desired force or a desired torque generated by one or more of the phases.

* * * * *